US012563242B2

(12) United States Patent
Atzitz et al.

(10) Patent No.: US 12,563,242 B2
(45) Date of Patent: Feb. 24, 2026

(54) UTILIZING A SINGLE BUFFER FOR A DYNAMIC NUMBER OF PLAYERS, EACH USING A DYNAMICALLY SIZED BUFFER

(71) Applicant: ROKU, INC., San Jose, CA (US)

(72) Inventors: Offer Atzitz, Menlo Park, CA (US);
Wim Michiels, San Jose, CA (US);
Huatao Weng, San Jose, CA (US);
Govind Vaidya, San Ramon, CA (US)

(73) Assignee: ROKU, INC., San Jose, CA (US)

( * ) Notice: Subject to any disclaimer, the term of this patent is extended or adjusted under 35 U.S.C. 154(b) by 146 days.

(21) Appl. No.: 18/227,178

(22) Filed: Jul. 27, 2023

(65) Prior Publication Data

US 2025/0039474 A1 Jan. 30, 2025

(51) Int. Cl.
H04N 21/231 (2011.01)

(52) U.S. Cl.
CPC ................................. H04N 21/231 (2013.01)

(58) Field of Classification Search
CPC .............. H04N 21/231; G06F 12/0842; G06F 12/0871; G06F 12/0284; G06F 12/084; G06F 2212/1008; G06F 2212/1016; G06F 2212/254; G06F 2212/311
See application file for complete search history.

(56) References Cited

U.S. PATENT DOCUMENTS

| | | | | |
|---|---|---|---|---|
| 5,596,726 A | * | 1/1997 | Thielen ................. | H04L 49/901 |
| | | | | 348/719 |
| 6,091,430 A | * | 7/2000 | Bodin ..................... | G09G 5/14 |
| | | | | 345/698 |
| 6,134,602 A | | 10/2000 | Engstrom et al. | |
| 7,958,255 B1 | * | 6/2011 | Karighattam ....... | H04L 49/9057 |
| | | | | 709/236 |
| 2003/0056041 A1 | * | 3/2003 | Connor ................. | H04L 69/166 |
| | | | | 710/58 |
| 2006/0123215 A1 | | 6/2006 | Paladini et al. | |
| 2014/0136643 A1 | | 5/2014 | Aerrabotu | |
| 2022/0413751 A1 | * | 12/2022 | Agarwal .............. | G06F 3/0658 |

OTHER PUBLICATIONS

Extended European Search Report directed to European Application No. 24190528.0, mailed Dec. 5, 2024; 10 pages.

* cited by examiner

*Primary Examiner* — Michael Krofcheck
(74) *Attorney, Agent, or Firm* — STERNE, KESSLER, GOLDSTEIN & FOX P.L.L.C.

(57) ABSTRACT

Disclosed herein are system, apparatus, article of manufacture, method and/or computer program product embodiments, and/or combinations and sub-combinations thereof, for utilizing a single storage buffer for a dynamic number of players, each using a dynamically sized virtual buffer. For example, a system includes a buffer management controller that receives a request to initiate at least one player instance for displaying a content item. The buffer management controller creates a virtual buffer having a maximum capacity for the player instance. Finally, the buffer management controller identifies one or more available regions of the single storage buffer and maps the virtual buffer to the one or more available regions in response to determining that address space in the one or more available regions matches or exceeds the maximum capacity of the virtual buffer.

20 Claims, 23 Drawing Sheets

700

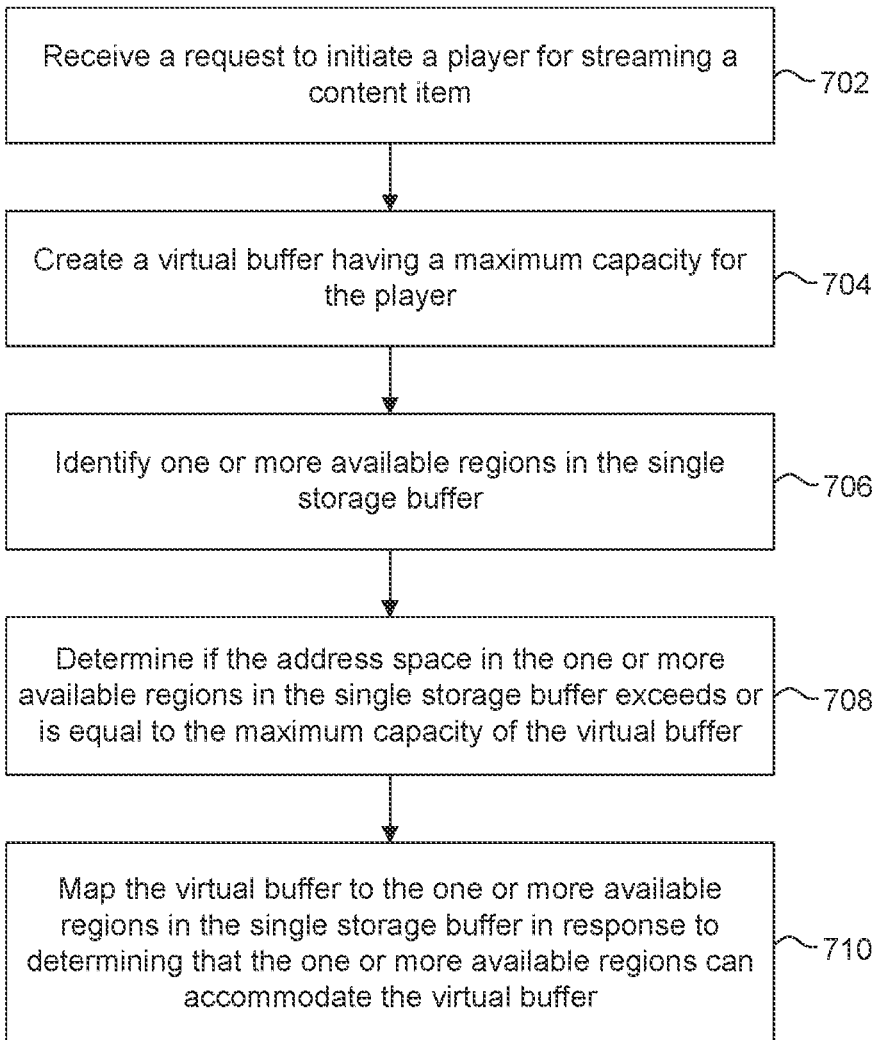

Receive a request to initiate a player for streaming a content item ⟍702

Create a virtual buffer having a maximum capacity for the player ⟍704

Identify one or more available regions in the single storage buffer ⟍706

Determine if the address space in the one or more available regions in the single storage buffer exceeds or is equal to the maximum capacity of the virtual buffer ⟍708

Map the virtual buffer to the one or more available regions in the single storage buffer in response to determining that the one or more available regions can accommodate the virtual buffer ⟍710

Figure 8:
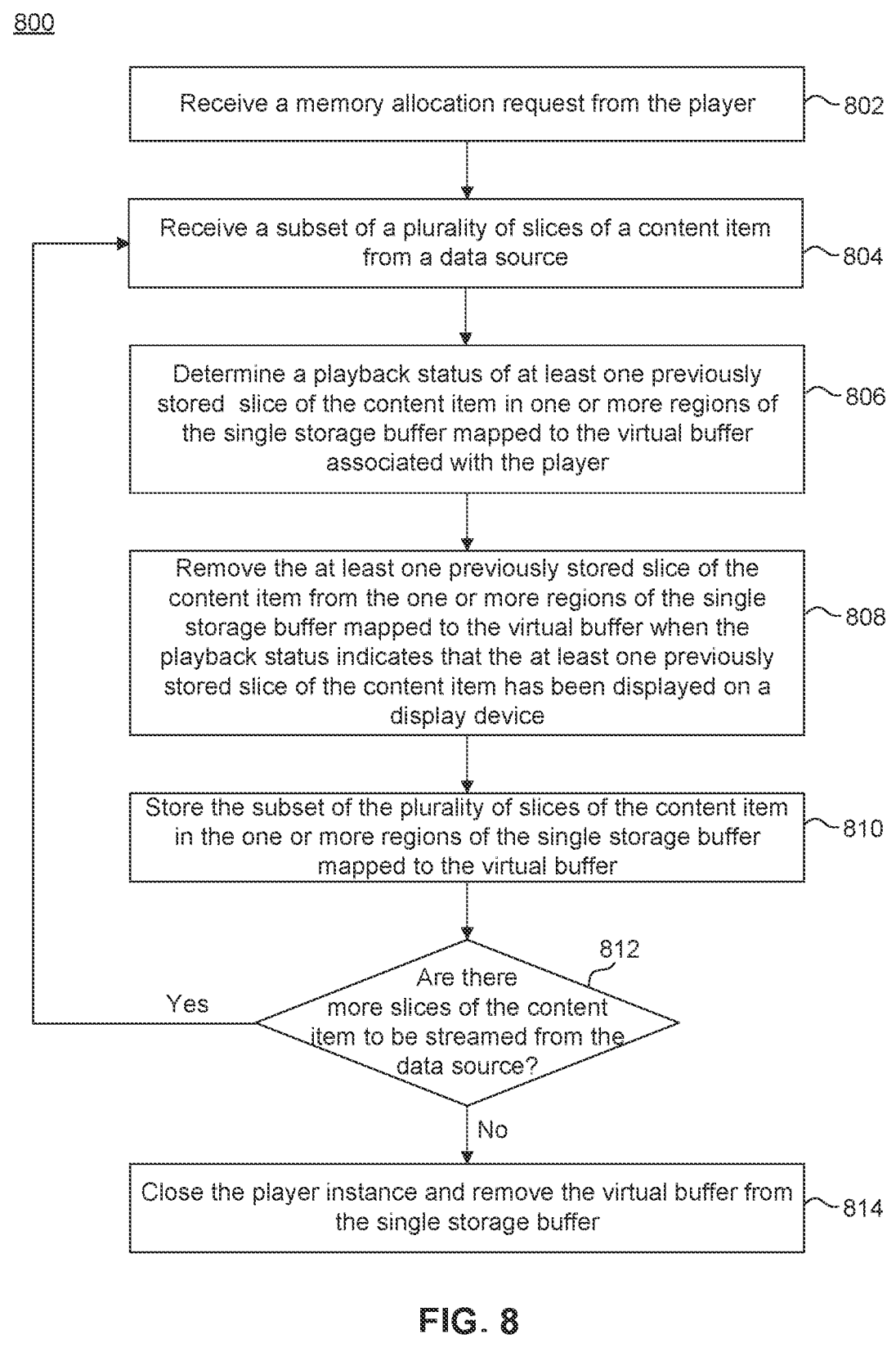

```
┌─────────────────────────────────────────────────────┐
│   Receive a memory allocation request from the player │─ 802
└─────────────────────────────────────────────────────┘
                          │
                          ▼
┌─────────────────────────────────────────────────────┐
│  Receive a subset of a plurality of slices of a content item │─ 804
│               from a data source                      │
└─────────────────────────────────────────────────────┘
                          │
                          ▼
┌─────────────────────────────────────────────────────┐
│  Determine a playback status of at least one previously │─ 806
│  stored  slice of the content item in one or more regions of │
│  the single storage buffer mapped to the virtual buffer │
│               associated with the player              │
└─────────────────────────────────────────────────────┘
                          │
                          ▼
┌─────────────────────────────────────────────────────┐
│  Remove the at least one previously stored slice of the │
│  content item from the one or more regions of the single │─ 808
│  storage buffer mapped to the virtual buffer when the │
│  playback status indicates that the at least one previously │
│  stored slice of the content item has been displayed on a │
│               display device                          │
└─────────────────────────────────────────────────────┘
                          │
                          ▼
┌─────────────────────────────────────────────────────┐
│  Store the subset of the plurality of slices of the content item │─ 810
│  in the one or more regions of the single storage buffer │
│             mapped to the virtual buffer              │
└─────────────────────────────────────────────────────┘
                          │
                          ▼
                   ╱◇◇◇◇◇◇◇◇◇◇◇╲         812
                  ╱   Are there   ╲
         Yes     ╱ more slices of the ╲
   ◄────────────◇ item to be streamed from the ◇
                 ╲    data source?   ╱
                  ╲◇◇◇◇◇◇◇◇◇◇◇◇◇◇╱
                          │ No
                          ▼
┌─────────────────────────────────────────────────────┐
│  Close the player instance and remove the virtual buffer from │─ 814
│             the single storage buffer                 │
└─────────────────────────────────────────────────────┘
```

UTILIZING A SINGLE BUFFER FOR A DYNAMIC NUMBER OF PLAYERS, EACH USING A DYNAMICALLY SIZED BUFFER

BACKGROUND

Field

This disclosure is generally directed to methods and systems for utilizing a single storage buffer for a variable number of players, where each player is assigned a dynamically sized virtual buffer or region in the single storage buffer to temporarily store portions of a downloaded content item prior to sending such portions of the content item to a display device.

SUMMARY

Provided herein are system, apparatus, article of manufacture, method and/or computer program product embodiments, and/or combinations and sub-combinations thereof, for utilizing a single storage buffer for a dynamic number of players, where each player is assigned a dynamically sized buffer. However, it is noted the following embodiments of this disclosure are not limited to the example embodiments, and other methods can be used for utilizing a single storage buffer for a dynamic number of players.

An example embodiment operates by a computer-implemented method. The method can include receiving, by a buffer management controller, a request to initiate at least one player for displaying a content item. The method further includes creating, by the buffer management controller, a virtual buffer having a maximum capacity for the at least one player, where the maximum capacity of the virtual buffer is determined based on at least one of: a number of existing virtual buffers, a total capacity of the single storage buffer, a maximum amount of players that can be initiated at a given time, and one or more quality requirements for the at least one player. The method further includes identifying, by the buffer management controller, one or more available regions in the single storage buffer. Finally, the method further includes mapping, by the buffer management controller, the virtual buffer to the one or more available regions in response to determining that the one or more available regions are sufficient to accommodate the virtual buffer.

In some embodiments, determining that the one or more available regions in the single storage buffer are sufficient to accommodate the virtual buffer can include determining, by the buffer management controller, that address space in the one or more available regions of the single storage buffer exceeds or is equal to the maximum capacity of the virtual buffer.

In some embodiments, the method can include receiving, by the buffer management controller, a memory allocation request from the at least one player. The method further includes receiving, by the buffer management controller, a subset of a plurality of slices of the content item from a data source. The method further includes storing, by the buffer management controller, the subset of the plurality of slices of the content item in one or more regions of the single storage buffer mapped to the virtual buffer associated with the at least one player.

In some embodiments, the method can include determining, by the buffer management controller, a status of at least one previously stored slice of the content item prior to storing the subset of the plurality of slices of the content item. The method further includes removing, by the buffer management controller, the at least one previously stored slice of the content item from the virtual buffer in response to determining that the status indicates that the at least one previously stored slice of the content item is not in use.

In some embodiments, the method can include selecting, by the buffer management controller, a first virtual buffer mapped to two or more non-contiguous regions of the single storage buffer. The method further includes consolidating, by the buffer management controller, the two or more non-contiguous regions mapped to the selected first virtual buffer into a single contiguous region of the single storage buffer. The method further includes mapping, by the buffer management controller, the selected first virtual buffer to the single contiguous region of the single storage buffer.

In some embodiments, consolidating the two or more non-contiguous regions mapped to the selected first virtual buffer into a single contiguous region of the single storage buffer can include identifying, by the buffer management controller, a target contiguous region and an eliminated region from the two or more non-contiguous regions. The method further includes determining, by the buffer management controller, a consolidation direction based on a shortest distance between the target contiguous region and the eliminated region. The method further includes identifying, by the buffer management controller, a moving region that is mapped to a second virtual buffer between the target contiguous region and the eliminated region along the consolidation direction. The method further includes shrinking, by the buffer management controller, the eliminated region by shifting at least one boundary of the eliminated region along the consolidation direction as one or more slices of the content item are removed from the eliminated region. The method further includes unmapping, by the buffer management controller, the eliminated region from the first virtual buffer. The method further includes shifting, by the buffer management controller, boundaries of the moving region along the consolidation direction to encompass address space in the single storage buffer previously used by the eliminated region. The method further includes extending at least one boundary of the target contiguous region along the consolidation direction to encompass address space in the single storage buffer previously used by the moving region.

In some embodiments, shifting the boundaries of the moving region along the consolidation direction to encompass the address space in the single storage buffer previously used by eliminated region can include extending, by the buffer management controller, a first boundary of the moving region to encompass the address space in the single storage buffer previously used by the eliminated region. The method further includes shrinking, by the buffer management controller, a second boundary of the moving region along the consolidation direction by an amount corresponding to the extension of the first boundary.

An example embodiment operates by a system including one or more memories and at least one processor each coupled to at least one of the one or more memories. The at least one processor may be configured to perform operations. The operations can include receiving, by a buffer management controller, a request to initiate at least one player for displaying a content item. The operations further include creating, by the buffer management controller, a virtual buffer having a maximum capacity for the at least one player, where the maximum capacity of the virtual buffer is determined based on at least one of: a number of existing virtual buffers, a total capacity of the single storage buffer, a maximum amount of players that can be initiated at a given time, and one or more quality requirements for the at least one player. The operations further include identifying, by the buffer management controller, one or more available regions in the single storage buffer. Finally, the operations further include mapping, by the buffer management controller, the virtual buffer to the one or more available regions in response to determining that the one or more available regions are sufficient to accommodate the virtual buffer.

An example embodiment operates by a non-transitory computer-readable medium having instruction stored thereon that, when executed by at least one computing device, cause the at least one computing device to perform operations, which can include receiving, by a buffer management controller, a request to initiate at least one sequentially-processing buffer-requiring component. The operations further include creating, by the buffer management controller, a virtual buffer having a maximum capacity for the at least one sequentially-processing buffer-requiring component, where the maximum capacity of the virtual buffer is determined based on at least one of: a number of existing virtual buffers, a total capacity of the single storage buffer, and a maximum amount of sequentially-processing buffer-requiring components that can be initiated at a given time. The operations further include identifying, by the buffer management controller, one or more available regions in the single storage buffer. Finally, the operations further include mapping, by the buffer management controller, the virtual buffer to the one or more available regions in response to determining that the one or more available regions are sufficient to accommodate the virtual buffer.

BRIEF DESCRIPTION OF THE FIGURES

The accompanying drawings are incorporated herein and form a part of the specification.

FIG. 7 illustrates a flowchart for creating a virtual buffer, according to some embodiments.

FIG. 8 illustrates a flowchart for storing a plurality of slices of a content items in a virtual buffer in a single storage buffer, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for utilizing a single storage buffer for a variable number of players, where each player is assigned a dynamically sized buffer or region in the single storage buffer to temporarily store portions of a content item prior to sending such portions of the content item to a display device. According to some embodiments, the player can be one or more of an image player, a sound player, a video player, or any component or device configured to output content items. Although some embodiments of this disclosure will be discussed with respect to a player, the embodiments of this disclosure may be used for any sequentially-processing buffer-requiring component or device. According to some embodiments, a sequentially-processing buffer-requiring component or device may include any component or device that uses one or more buffers for sequentially processing data.

Figure 1:
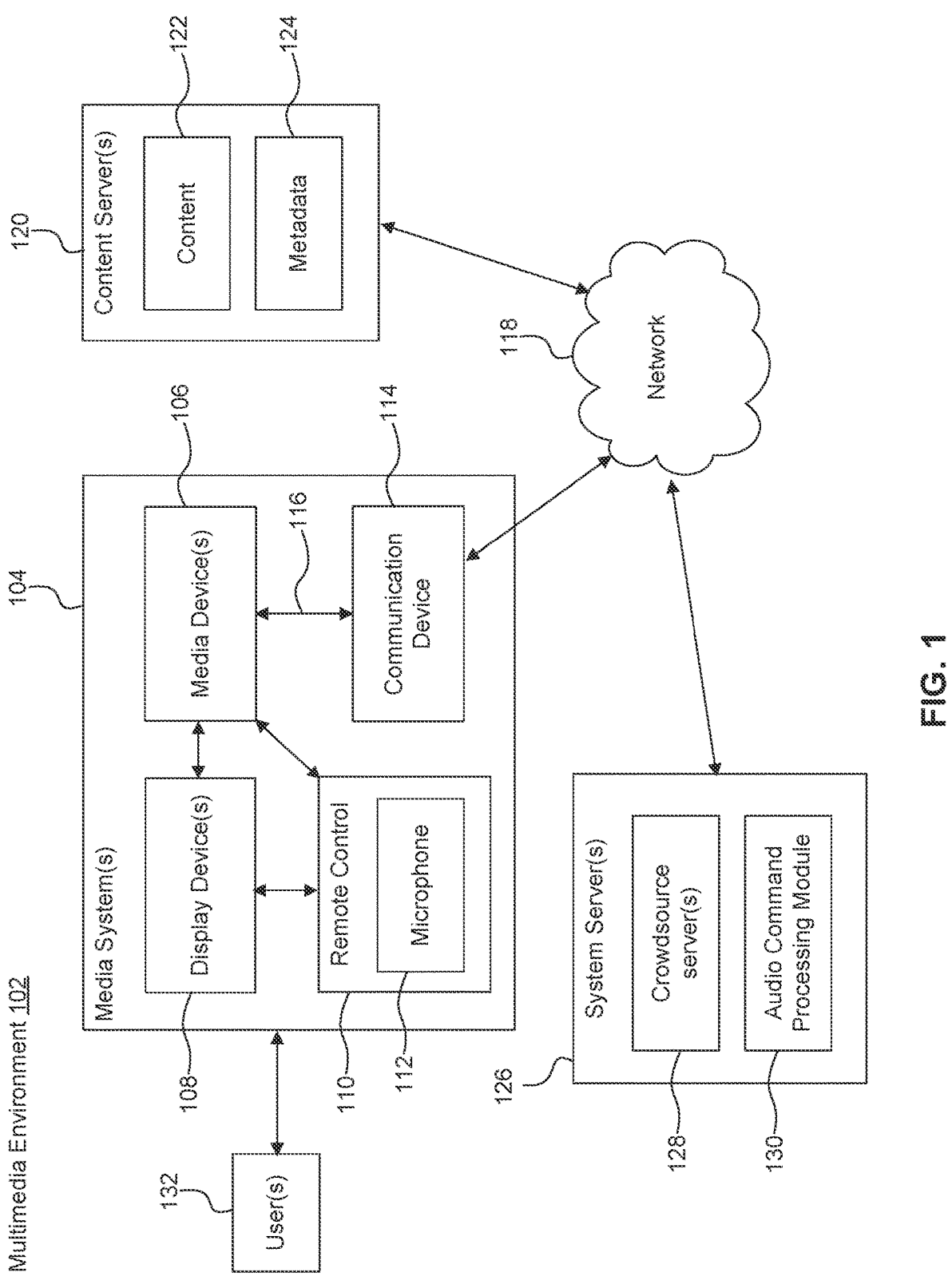
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
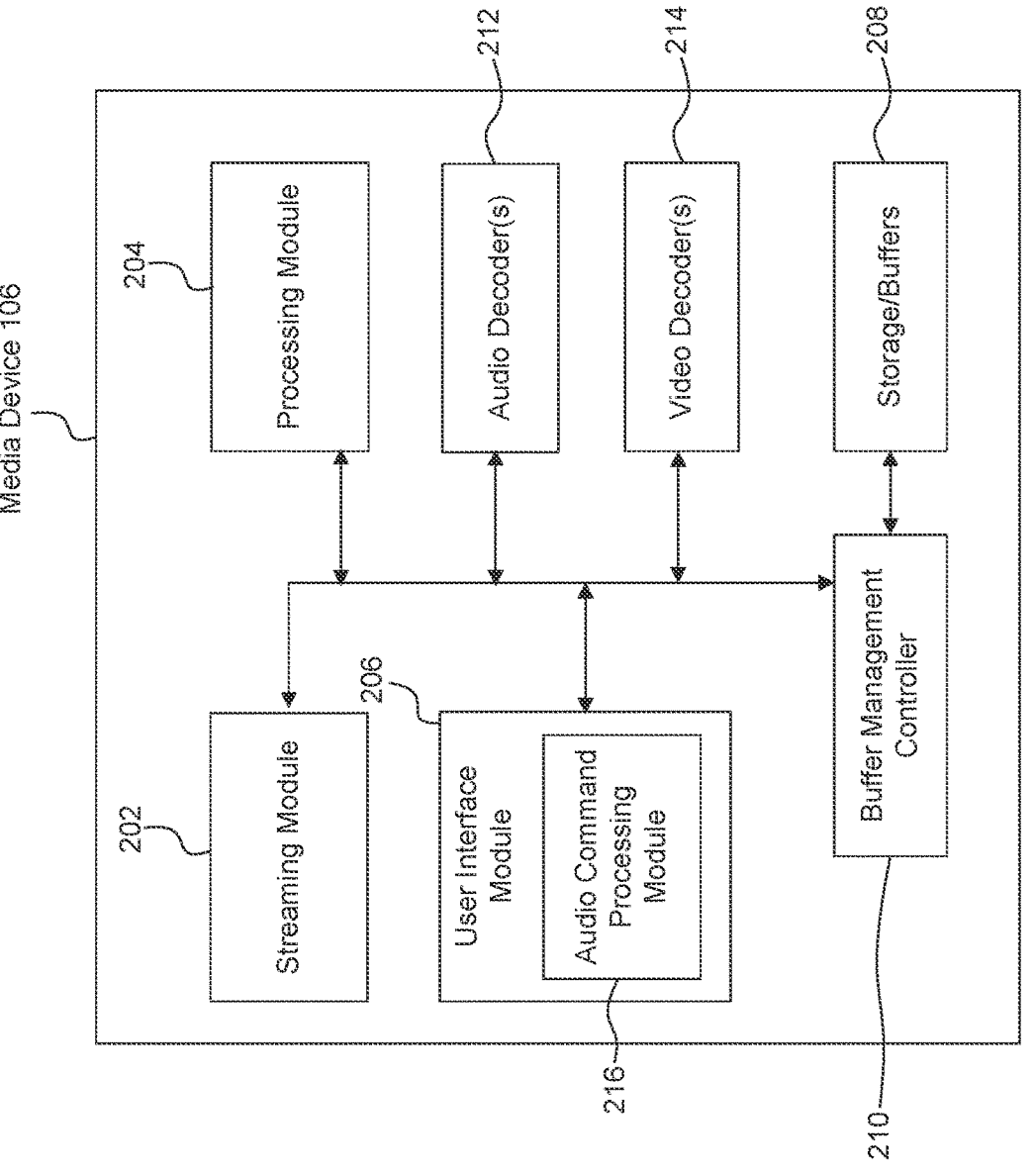
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, user interface module 206, storage/buffers 208, and buffer management controller 210. As mentioned earlier, the user interface module 206 may include the audio command processing module 216. In some embodiments, storage/buffers 208 may include a storage buffer for pre-loading one or more content items prior to display on a display device and a back buffer for temporarily storing previously displayed slices of content in order to allow a player instance to quickly seek back to these slices without the need to download them again. In some embodiments, the buffer management controller 210 may be configured to receive and store content item data in storage/buffers 208 as well as remove content item data from storage/buffers 208. The buffer management controller 210 may be implemented as software, hardware, or a combination of software and hardware.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Utilizing a Single Buffer for a Dynamic Number of Players

Consumer media devices may be configured to enable multiple player instances to simultaneously display content downloaded from various data sources including, but not limited to, content-streaming applications, broadcast and cable channels, security camera feeds, and social networking applications, to a display device. The multiple player instances may include one or more of an image player, a sound player, a video player, or any other component or device configured to output content items. Content items may include, but are not limited to, images, audio files, video files, videogames, and other software applications. However, the simultaneous display of different content items on a display device may require each player instance to preload large amounts of data (e.g., 10s of MBs). Since most consumer media devices only have a limited amount of memory allotted for preloading content items, efficient memory utilization and preventing unnecessary copies of data within the allotted memory are necessary for developing multi-decode capabilities. To enable the display of multiple content items from a media device (e.g., media device 106), the media device may be configured to utilize a pre-allocated memory (e.g., a single storage buffer) and assign portions of the pre-allocated memory to different player instances. However, as player instances are dynamically added, configured, and removed, the pre-allocated memory may become fragmented, resulting in multiple portions of the pre-allocated memory being assigned to a single player. Accordingly, what is needed is an improved method and system for utilizing memory that allows a single player instance to use multiple non-contiguous regions of a pre-allocated memory as if it were a single storage buffer and dynamically shift the non-contiguous regions in a way that the single player will eventually use a single contiguous region of the pre-allocated memory.

Figure 3A:
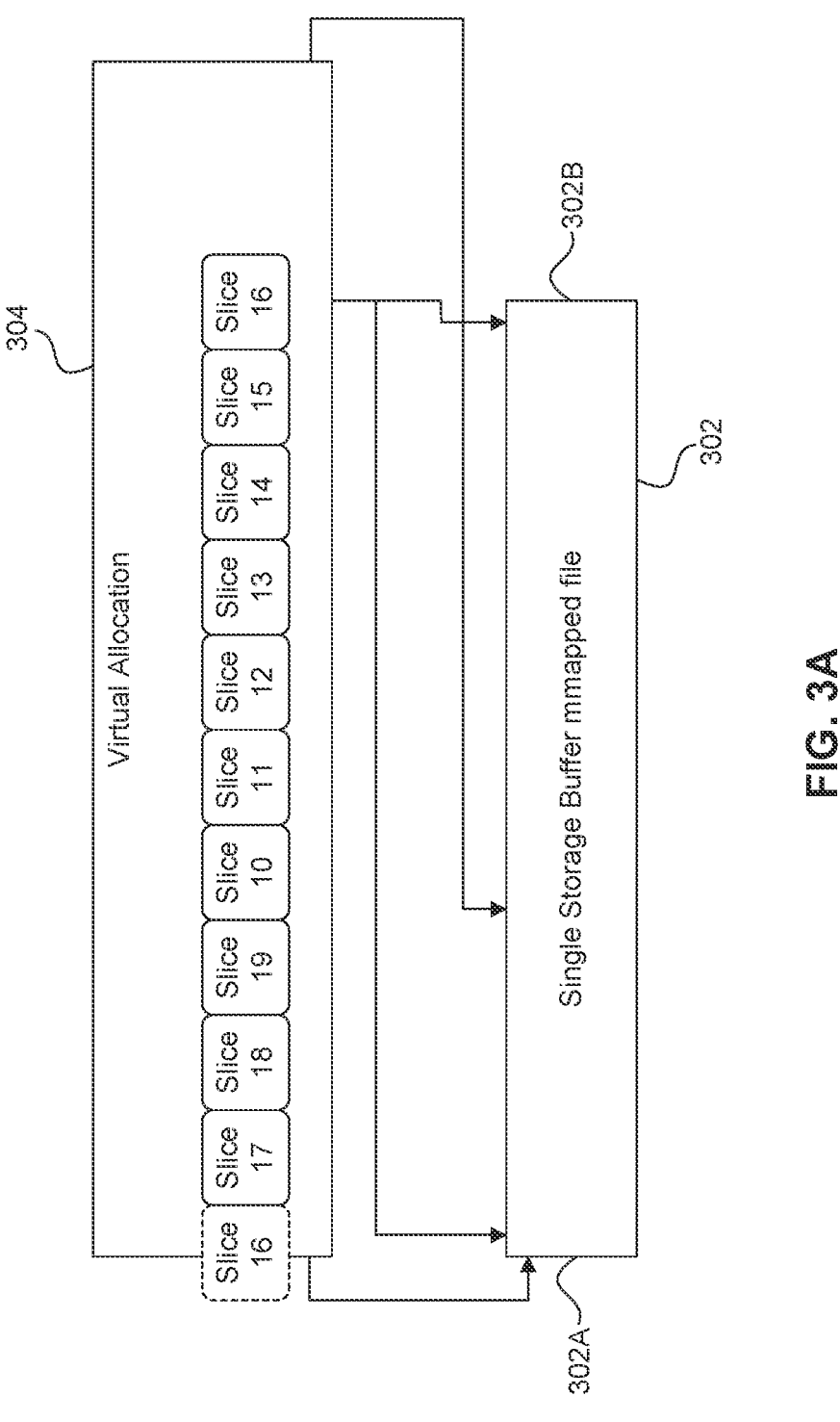
FIGS. 3A-D illustrate block diagrams of storage buffer implementations, according to some embodiments.

FIG. 3A illustrates a prior implementation of storage/ buffers 208 of media device 106 for displaying a single content item. Storage/buffers 208 of media device 106 may include a single storage buffer 302. Single storage buffer 302 may be adapted to store slices (i.e., portions) of the content item from a data source (e.g., content server 120) before providing the slices to a display device 108. Each slice of the content item may be a data packet comprising a header, a payload, a sequence number, a status indicator, and metadata. The header may include a network address for the data source that provided the content item, a network address for the media device 106 that downloaded or received the content item, and an identifier for the content item. The payload may include a portion of content item data transmitted to media device 106. The sequence number may include a number or timestamp that identifies the position of a slice in a series of slices transmitting the content item. The status indicator may comprise data or a flag that indicates a playback status of a particular slice. For example, the status indicator may inform whether the slice is being used or referenced by a player instance or back buffer. Finally, metadata may include any additional data about the content item such as, but not limited to, segment duration and closed captioning or transcript data. Single storage buffer 302 may be a storage buffer in a reserved area of a memory device (e.g., a random access memory) with a memory mapped file having the same address space as the memory device. The memory mapped file may be configured to allow for the simultaneous storage of new slices of a content item in the storage buffer and the provision of older slices stored in the storage buffer to a display device 108 for playback. Furthermore, as shown in FIG. 3A, the single storage buffer 302 may have a front boundary 302A and a rear boundary 302B. Front boundary 302A may represent a position in the single storage buffer 302 with the oldest slice of a content item (e.g., slice of content item with earliest sequence number), and the rear boundary 302B may represent a position in the single storage buffer 302 with the newest or most recent slice of the content item (e.g., slice of content item with latest sequence number).

Figure 3B:
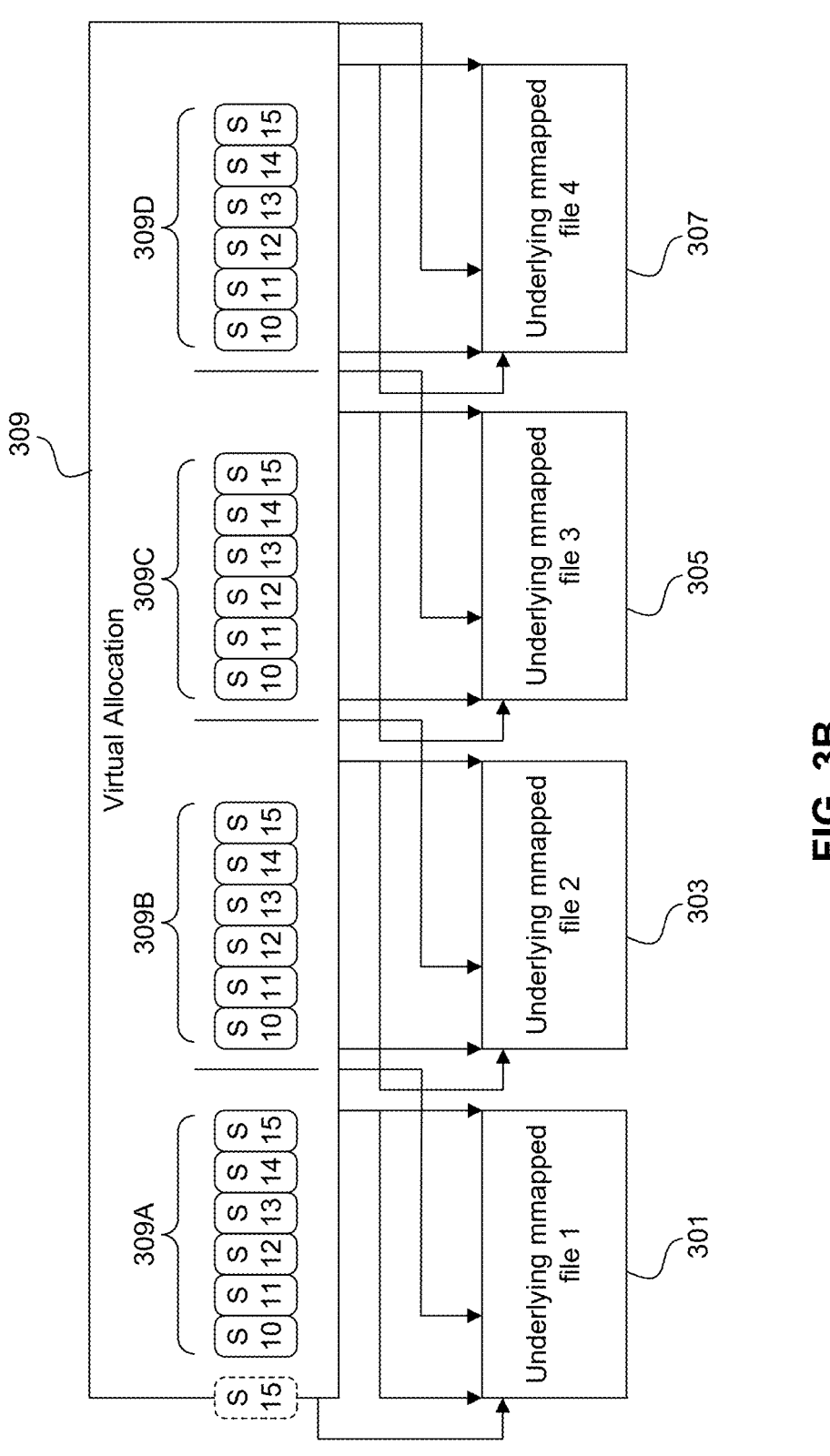

FIG. 3B illustrates an initial approach for displaying multiple content items in parallel, which may entail dynamically implementing a storage buffer for each player instance as an underlying memory mapped file. The underlying memory mapped files 301, 303, 305, and 307 may be created in response to the instantiation of four player instances. Underlying memory mapped files 301, 303, 305, and 307 may each correspond to a portion of a reserved area of a memory device and may have the same address space as the corresponding portion of the memory device. Furthermore, each of the underlying memory mapped files 301, 303, 305, and 307 may be assigned to a player instance for use as a storage buffer. For example, Underlying Memory Mapped File 1 301 may be assigned to a first player instance, Underlying Memory Mapped File 2 303 may be assigned to a second player instance, Underlying Memory Mapped File 3 305 may be assigned to a third player instance, and Underlying Memory Mapped File 4 307 may be assigned to a fourth player instance. A media device 106 implementing the approach in FIG. 3B may play or display four content items in parallel by allocating slices of a first content item 309A to Underlying Memory Mapped File 1 301, slices of a second content item 309B to Underlying Memory Mapped File 2 303, slices of a third content item 309C to Underlying Memory Mapped File 3 305, and slices of a fourth content item 309D to Underlying Memory Mapped File 4 307. Dynamically implementing a storage buffer as an underlying memory mapped file for each player instance may be an advantageous approach because it allows for efficient utilization of memory. For example, memory mapped files can be shared across multiple processes without needing to copy memory or fragment a process heap with large allocations. However, this approach may be unable to dynamically extend or shrink a storage buffer for each player instance without moving data around. This approach may also fail entirely when a large storage buffer is required.

Figure 3C:
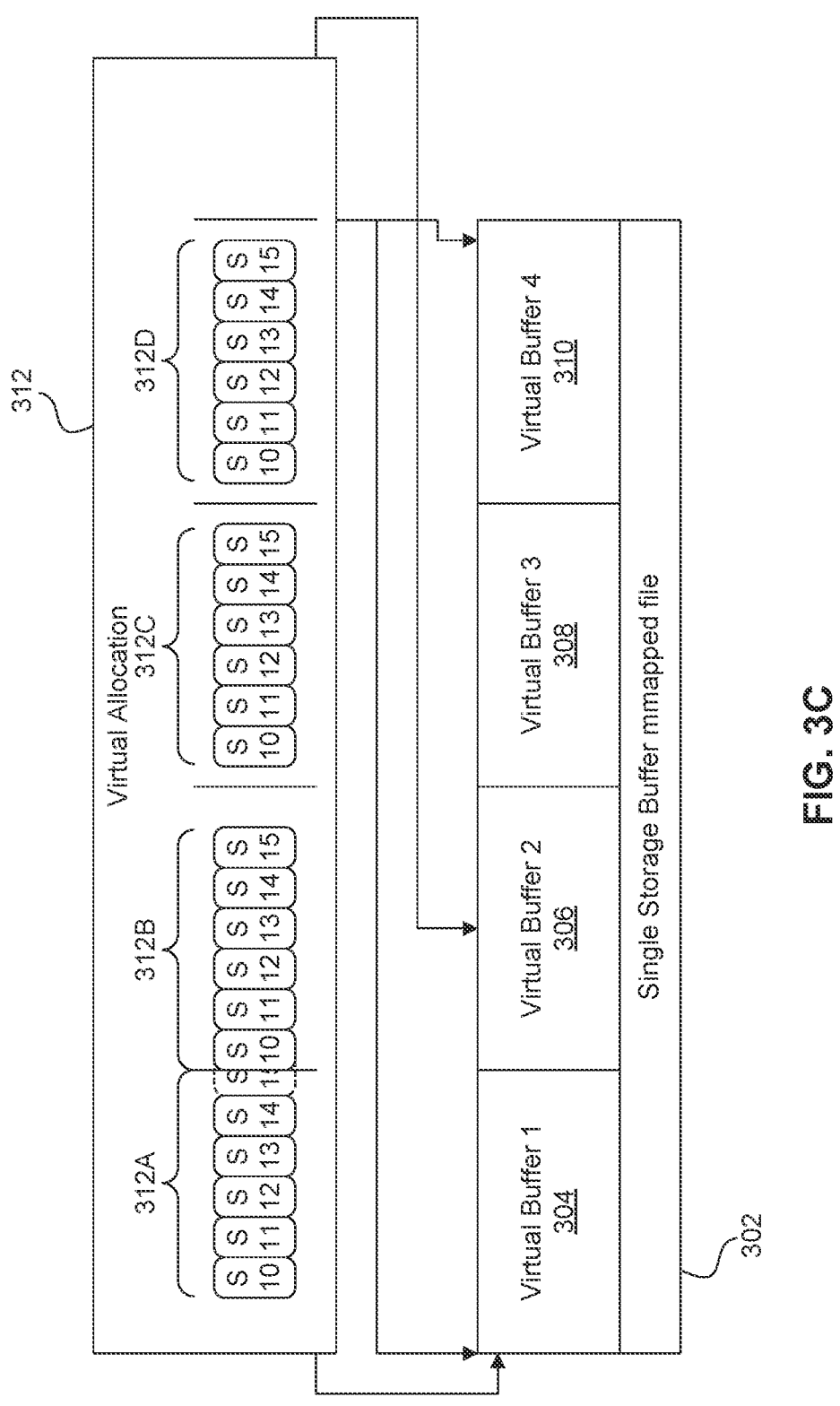
Figure 3D:
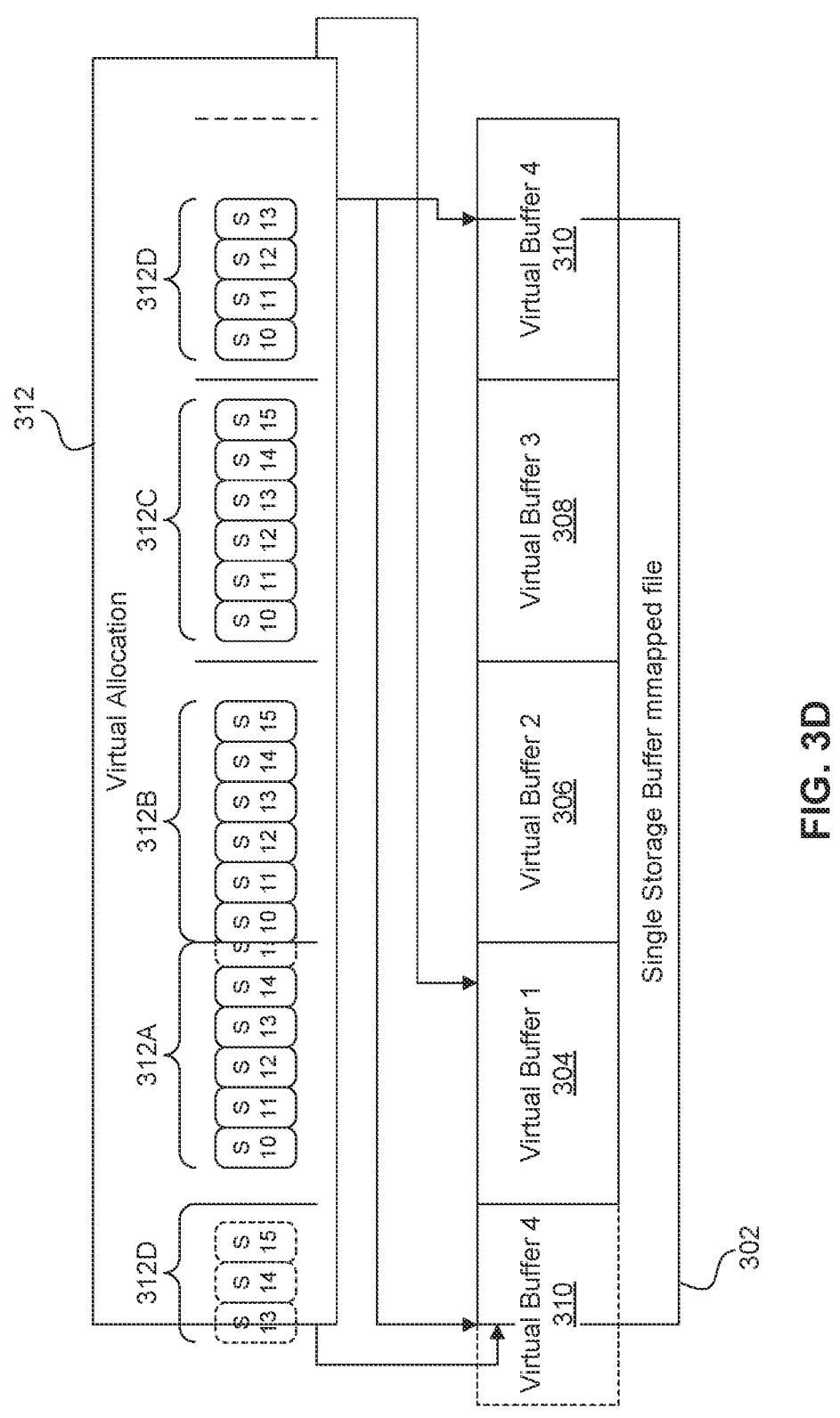

FIGS. 3C and 3D illustrate an exemplary approach for displaying multiple content items in parallel, which may entail configuring a virtual buffer for each player instance and mapping the virtual buffer(s) to one or more regions of a single storage buffer 302. The single storage buffer 302 may be a storage buffer in a reserved area of a memory device with a memory mapped file having the same address space as the memory device. A virtual buffer may be a data structure that enables a player instance or other type of client process to use one or more non-contiguous regions of single storage buffer 302 as if they were a single contiguous buffer. A buffer management controller 210 may be configured to create a virtual buffer for each player instance after it is instantiated. For example, as shown in FIG. 3C, the buffer management controller 210 may create Virtual Buffer 1 304 for a first player instance, Virtual Buffer 2 306 for a second player instance, Virtual Buffer 3 308 for a third player instance, and Virtual Buffer 4 310 for a fourth player instance. The buffer management controller 210 may further be configured to control the allocation and removal of slices of a content item from the virtual buffer(s). For example, the buffer management controller 210 may enable the simultaneous display of four content items by media device 106 by allocating slices of a first content item 312A to Virtual Buffer 1 304, slices of a second content item 312B to Virtual Buffer 2 306, slices of a third content item 312C to Virtual Buffer 3 308, and slices of a fourth content item 312D to Virtual Buffer 4 310. However, in other alternative embodiments, a virtual buffer may include its own logic or software code that would allow the virtual buffer—not the buffer management controller 210—to manage usage of the one or more regions of the single storage buffer 302 mapped to the virtual buffer. Furthermore, as depicted in FIG. 3D, the boundaries of the virtual buffers (e.g., Virtual Buffer 4 310) do not have to align with the physical boundaries of the single storage buffer 302.

As will be discussed in detail regarding FIGS. 4A-4D and 5A-5D, the boundaries of virtual buffers may be flexible, and the maximum capacity of each virtual buffer can be dynamically configured, extended, and reduced based on factors such as the number of existing virtual buffers, a total capacity of the single storage buffer, a maximum amount of player instances that can be initiated at a given time, the amount of address space necessary to allocate a sufficient number of slices of a content item to the virtual buffer, one or more playback requirements for at least one player instance, or the like. Furthermore, as will be discussed regarding FIGS. 6A-6E, virtual buffers may also enable the dynamic adjustment of the assigned regions in a way that each player instance will eventually use a single contiguous region in the storage buffer without copying data in the memory.

Figure 4A:
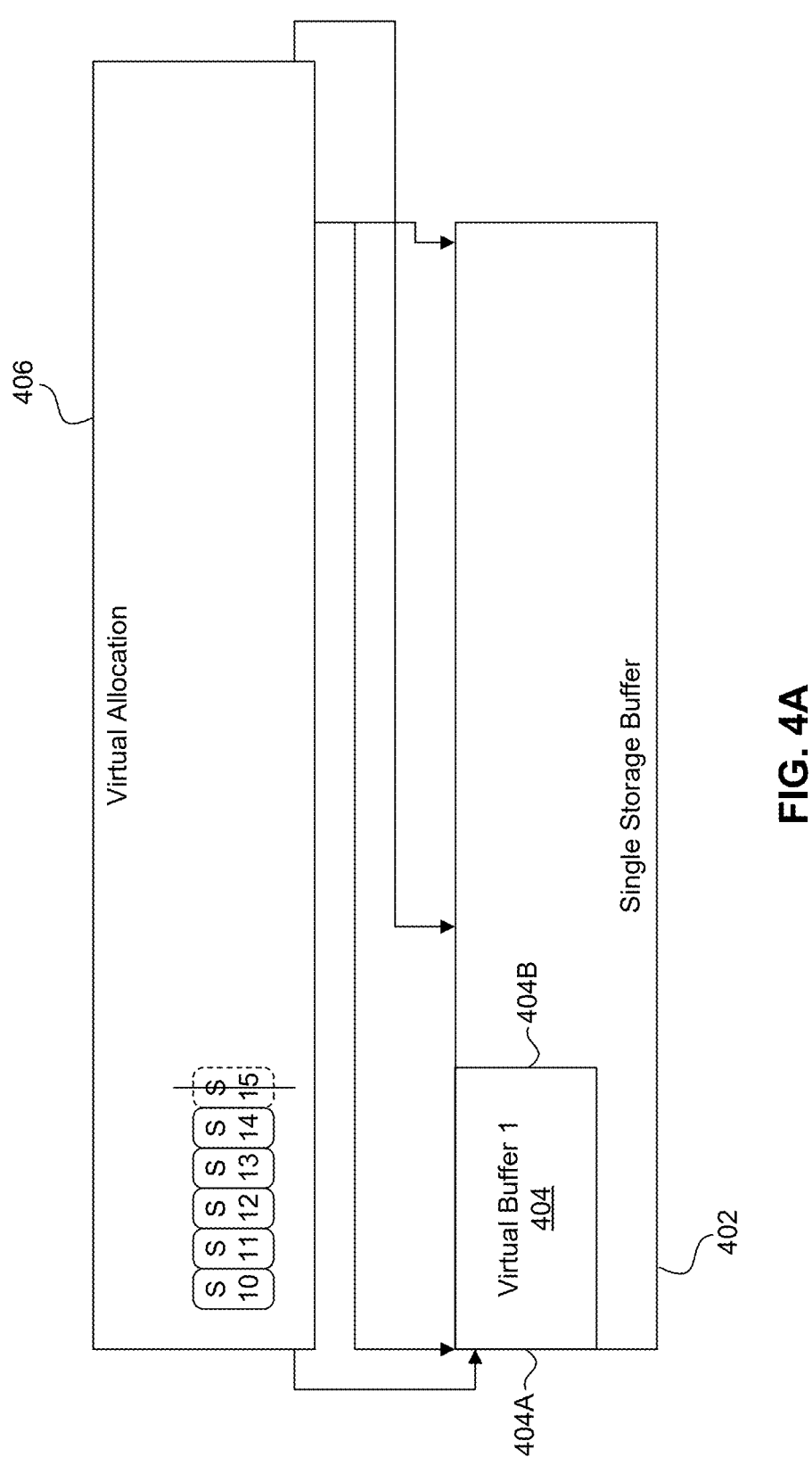
FIGS. 4A-4D illustrate block diagrams depicting a process for expanding a virtual buffer in a single storage buffer, according to some embodiments.

FIGS. 4A-4D illustrate block diagrams depicting a process for expanding a virtual buffer in a single storage buffer, according to some embodiments of the disclosure. FIG. 4A displays a Virtual Buffer 1 404 that includes an initial region of address space in a single storage buffer 402. Virtual Buffer 1 404 may have a front boundary 404A and a rear boundary 404B. Front boundary 404A may represent a position in Virtual Buffer 1 404 with the oldest slice of a content item (e.g., slice of content item with earliest sequence number), and the rear boundary 404B may represent a position in Virtual Buffer 1 404 with the newest or most recent slice of the content item (e.g., slice of content item with latest sequence number). As mentioned earlier, a buffer management controller 210 may create a virtual buffer in response to receiving a request to instantiate a player instance. For example, in FIG. 4A, Virtual Buffer 1 404 may correspond to a first player instance. The buffer management controller 210 may dynamically configure the maximum capacity of Virtual Buffer 1 404 based on one or more factors, including but not limited to, a number of existing virtual buffers, a total capacity of the single storage buffer 402, a maximum amount of player instances that can be initiated at a given time, one or more playback requirement(s) for the at least one player instance, the amount of address space necessary to allocate a sufficient number of slices of content to the virtual buffer, or the like. The buffer management controller 210 may identify one or more available regions of address space in single storage buffer 402. The buffer management controller 210 may determine if the one or more available regions are sufficient to accommodate the maximum capacity of the virtual buffer. If the buffer management controller 210 determines that the one or more available regions are sufficient to accommodate the maximum capacity of the virtual buffer, the buffer management controller 210 may map the virtual buffer to the one or more available regions in the single storage buffer 402 by recording the address locations for the front boundary and rear boundary of the virtual buffer in an index file. For example, as shown in FIG. 4A, the buffer management controller 210 may map Virtual Buffer 1 404 to a region corresponding to the dynamically configured maximum capacity of the virtual buffer in single storage buffer 402 and record the address locations for the front boundary 404A and rear boundary 404B of the virtual buffer in an index file. If the buffer management controller 210 determines that the address space in the one or more available regions is less than the maximum capacity of the virtual buffer, the buffer management controller 210 may temporarily reduce the maximum capacity of the virtual buffer to a level matching the capacity of the one or more available regions and map the reduced virtual buffer to the one or more available regions according to some embodiments. Alternatively, in other embodiments, the buffer management controller 210 may wait to map the virtual buffer until a sufficient amount of address space becomes available in the single storage buffer 402. Once the buffer management controller 210 has created a virtual buffer for a player instance and mapped it to the one or more available regions in the single storage buffer 402, the buffer management controller 210 may allocate a plurality of slices of a content item to the virtual buffer. For example, as shown in FIG. 4A, the buffer management controller 210 may allocate slices 10-14 of a content item 406 to Virtual Buffer 1 404. Alternatively, in other embodiments, a virtual buffer may control the allocation of slices of a content item to the one or more regions mapped to it. As mentioned earlier, a virtual buffer may include its own logic or software code that enables the virtual buffer to manage usage of the one or more mapped regions of the single storage buffer 302. In such alternative embodiments, the virtual buffer may receive and store a plurality of slices of a content item from a data source.

Figure 4B:
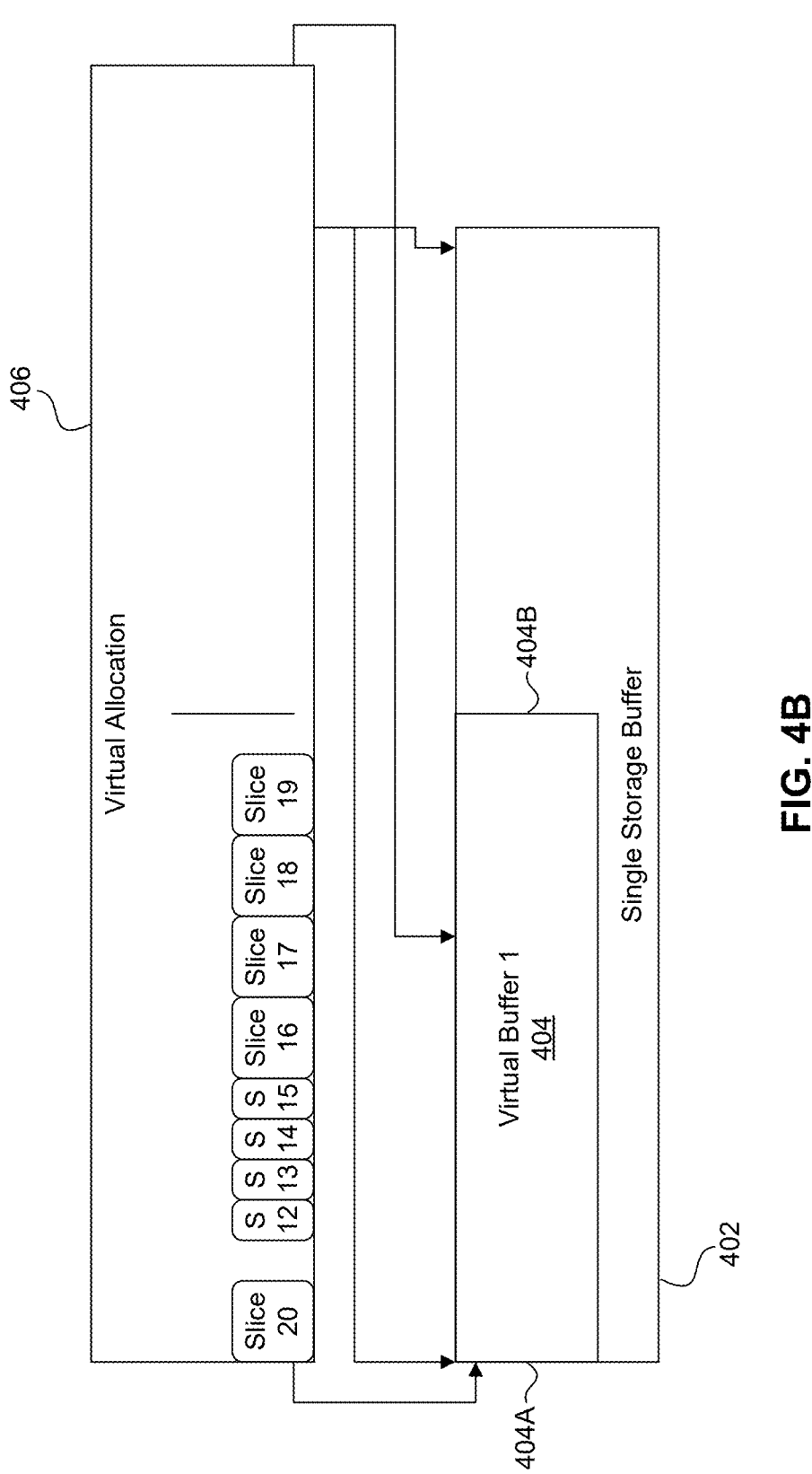

FIG. 4B displays the partial expansion of a virtual buffer to encompass additional address space in the single storage buffer, according to some embodiments of the disclosure. The buffer management controller 210 may expand a virtual buffer in response to a request to improve the playback quality of the player instance associated with the virtual buffer. In some embodiments, the buffer management controller 210 may expand a virtual buffer by increasing the maximum capacity of the virtual buffer and extending one or both boundaries of the virtual buffer to utilize adjacent address space in the single storage buffer 402. For example, as shown in FIG. 4B, the rear boundary 404B of Virtual Buffer 1 404 may be extended such that the virtual buffer utilizes a larger section (e.g., half) of the address space in the single storage buffer 402. If there is no available address space adjacent to Virtual Buffer 1 404, the buffer management controller 210 may identify and assign one or more non-contiguous regions of available address space in the single storage buffer 402 to the virtual buffer. The buffer management controller 210 may additionally update the index file to reflect the new address locations for the front boundary 404A and/or rear boundary 404B of Virtual Buffer 1 404 in the single storage buffer 402. As shown in FIG. 4B, the partially-extended Virtual Buffer 1 404 may now be large enough to support both the allocation of additional slices of a content item 406 (e.g., slice 15) as well as larger slices of the content item (e.g., slices 16-20). Larger slices of a content item may reflect data packets that contain additional information necessary for the player instance to provide greater playback quality of content to display device 108. Older slices of the content item that are no longer in use or referenced by a player instance or back buffer, such as slices 10 and 11 in FIG. 4A, may be removed from Virtual Buffer 1 404 in order to create space for the allocation of newer slices of the content item, such as slice 20 in FIG. 4B.

Figure 4C:
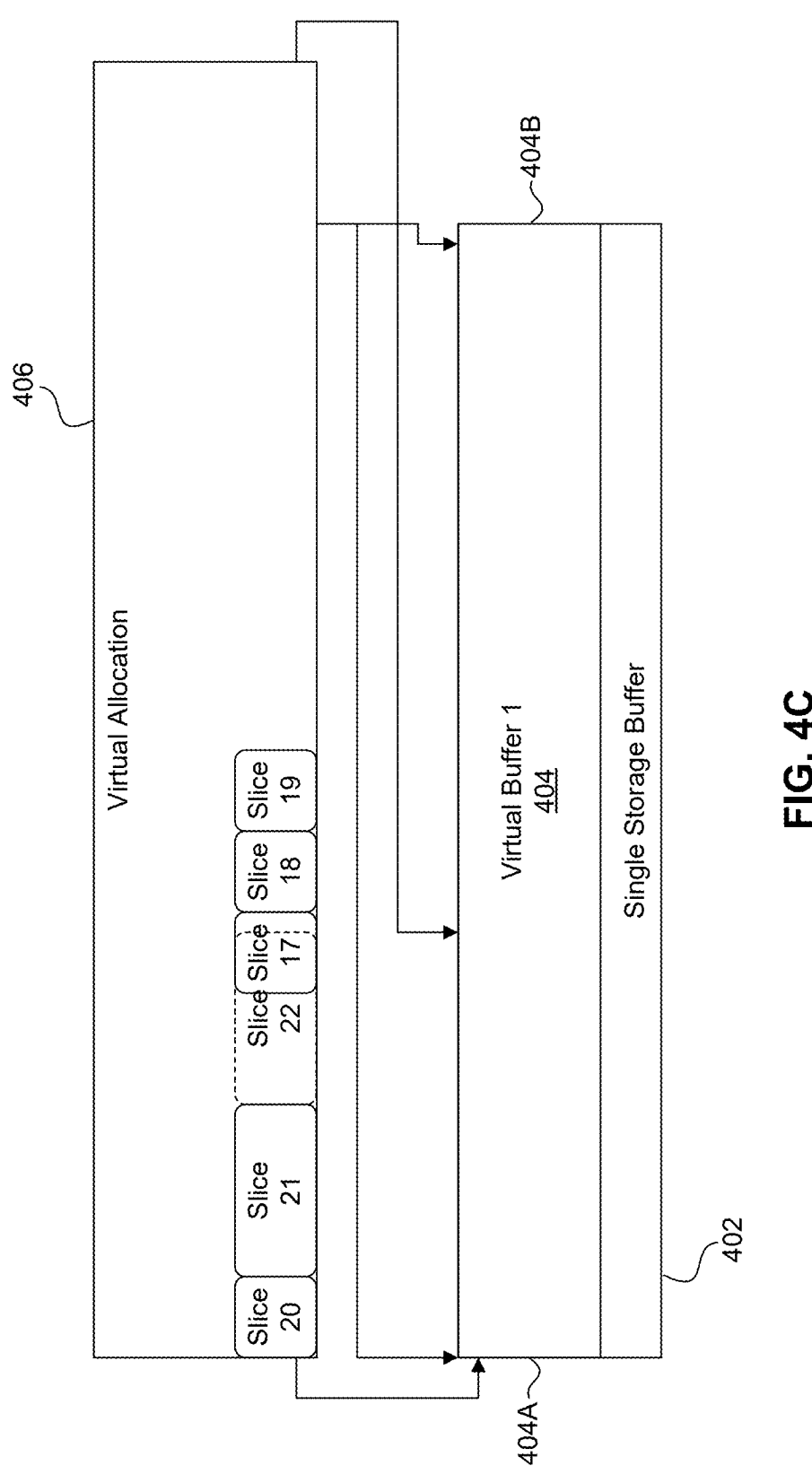

FIG. 4C displays a partial utilization of the single storage buffer 402 by a fully-expanded virtual buffer, according to some embodiments of the disclosure. The buffer management controller 210 may further expand a virtual buffer in response to additional request(s) to improve the playback quality of the player instance associated with the virtual buffer. In some embodiments, the buffer management controller 210 may increase the maximum capacity of the virtual buffer and extend one or both boundaries of the virtual buffer to utilize additional address space in the single storage buffer 402. For example, as shown in FIG. 4C, the rear boundary 404B of Virtual Buffer 1 404 may be extended such that the virtual buffer utilizes the entire address space of single storage buffer 402. Afterwards, the buffer management controller 210 may again update the index file to reflect the new address locations for the front boundary 404A and/or rear boundary 404B of Virtual Buffer 1 404 in the single storage buffer 402. Furthermore, as displayed in FIG. 4C, the buffer management controller 210 may allocate new, larger slices of a content item (e.g., slice 21), which may be indicative of greater playback quality, to Virtual Buffer 1 404 as older slices (e.g., such as slices 12-16 in FIG. 4B) are removed when they are no longer in use or referenced by a player instance or back buffer. In some embodiments, the size of slices of a content item may be determined by streaming module 202 based on various factors including, but not limited to, a stream bitrate and segment duration. However, according to some examples, the single storage buffer 402 may remain under-utilized despite the full extension of Virtual Buffer 1 404. As shown in FIG. 4C, new slices of a content item (e.g., slice 22) may not be allocated to Virtual Buffer 1 404 until older slices (e.g., slices 17-19) are removed from the virtual buffer when they are not in use or referenced by a player instance or back buffer.

Figure 4D:
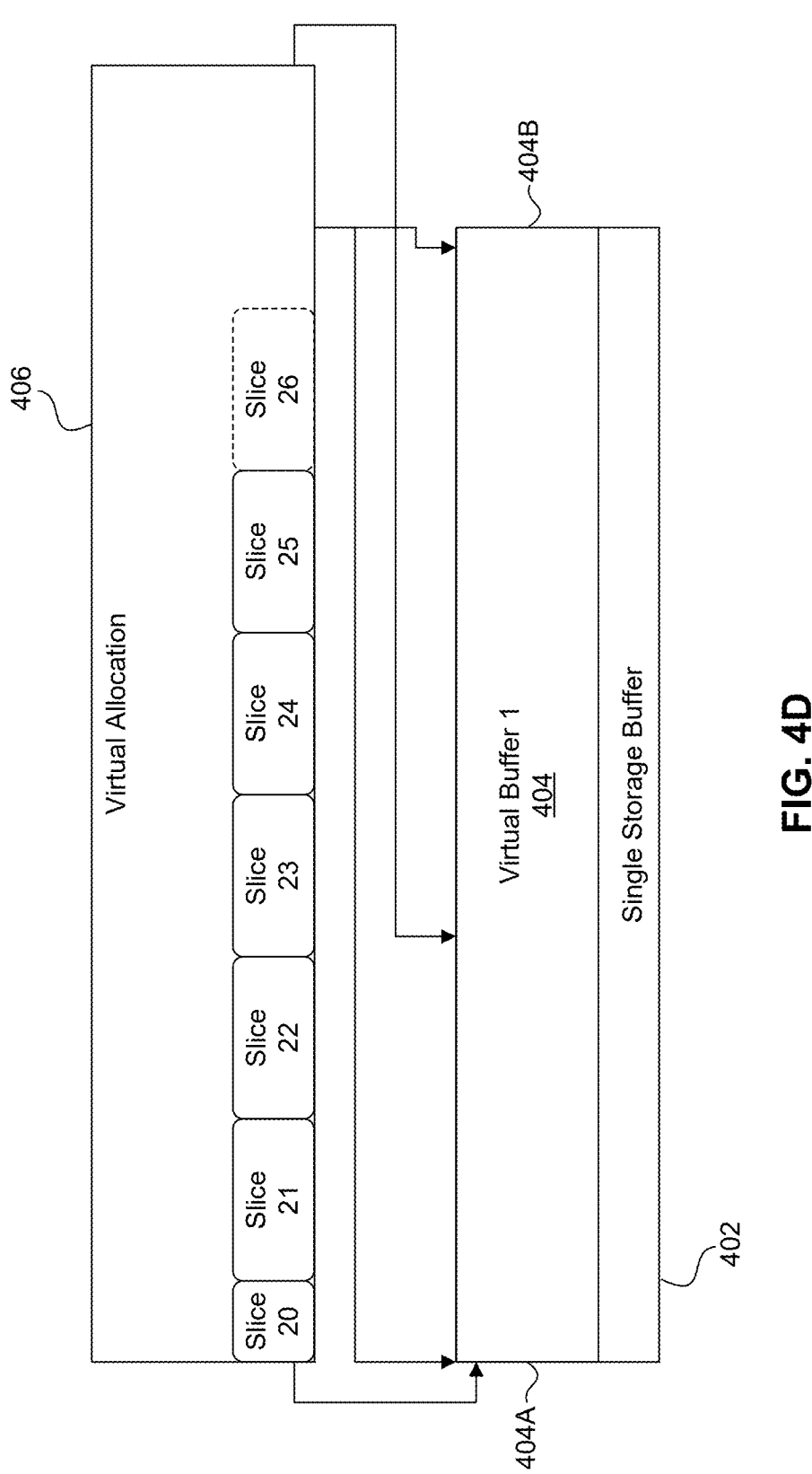

FIG. 4D displays the full-utilization of the single storage buffer 402 by a fully-extended virtual buffer, according to some embodiments of the disclosure. For example, as shown in FIG. 4C, the rear boundary 404B of Virtual Buffer 1 404 may be extended such that the virtual buffer utilizes the entire address space of single storage buffer 402. Furthermore, in FIG. 4D, the buffer management controller 210 may allocate new slices 22-26 of the content item 406 to the fully-extended Virtual Buffer 1 404 as older slices are removed from the virtual buffer when they are no longer in use or referenced by a player instance or back buffer.

Figure 5A:
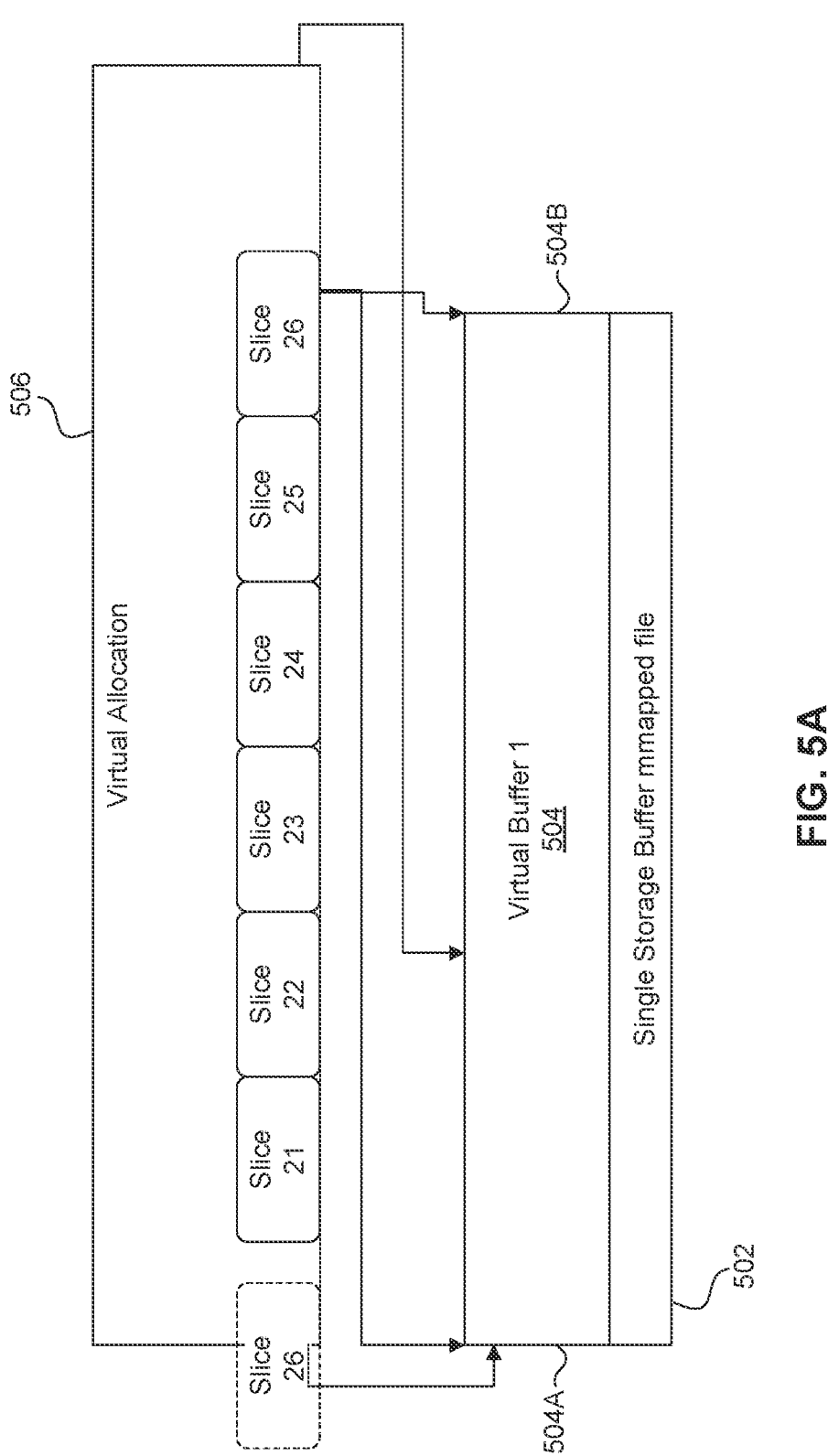
FIGS. 5A-5D illustrate block diagrams depicting a process for shrinking a virtual buffer in a single storage buffer, according to some embodiments.

FIGS. 5A-5D illustrate block diagrams depicting a process for shrinking, or reducing a size of, a virtual buffer in a single storage buffer, according to some embodiments. FIG. 5A illustrates a fully-extended Virtual Buffer 1 504 that utilizes the entire address space of single storage buffer 502.

Figure 5B:
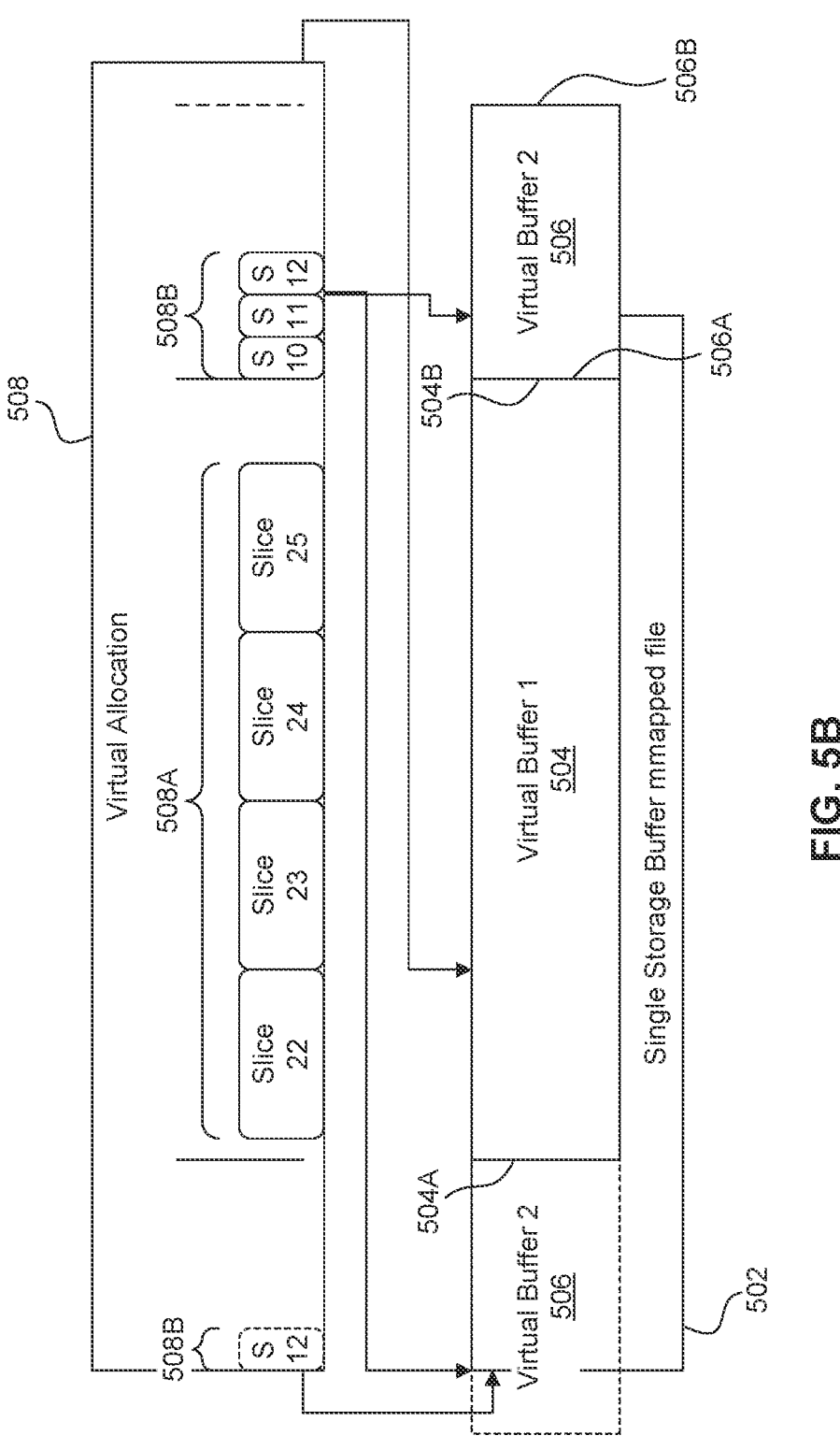

FIG. 5B illustrates the reduction of a virtual buffer, according to some embodiments of the disclosure. The instantiation of a new player instance may trigger the buffer management controller 210 to dynamically shrink one or more virtual buffers in the single storage buffer 502 and create a virtual buffer for the new player instance. By shrinking one or more virtual buffers, the buffer management controller 210 may ensure that a sufficient number of slices of a content item can be allocated to the virtual buffer associated with the new player instance. In some embodiments, the buffer management controller 210 may shrink a virtual buffer by purging data in the areas near the front and rear boundaries of the virtual buffer. The buffer management controller may reduce the maximum capacity of the virtual buffer and adjust one or both of the boundaries to relinquish unused address space back to the single storage buffer 502. For example, as shown in FIG. 5B, the buffer management controller 210 may purge slices 21 and 26 of a content item previously displayed in FIG. 5A from Virtual Buffer 1 504. Alternatively, in other embodiments, Virtual Buffer 1 504 may purge slices 21 and 26 upon receiving a signal or instruction from the buffer management controller 210 to free up space. Furthermore, the buffer management controller 210 may afterwards reduce the maximum capacity of Virtual Buffer 1 504 by retracting the front boundary 504A and/or rear boundary 504B of the virtual buffer. The buffer management controller 210 may further update the index file to reflect the new address locations for the front boundary 504A and/or rear boundary 504B of Virtual Buffer 1 504 in the single storage buffer 502. Additionally, the buffer management controller 210 may map Virtual Buffer 2 506 associated with a second player instance to one or more available regions in single storage buffer 502. The buffer management controller 210 may record the address locations for the front boundary 506A and 506B of Virtual Buffer 2 506 in the index file. Similar to the virtual buffers in FIG. 3D, the boundaries of Virtual Buffer 2 506 do not have to align with the physical boundaries of the single storage buffer 502. The buffer management controller 210 may also limit the playback quality for the second player instance to ensure that a sufficient number of slices of a content item can be allocated to Virtual Buffer 2 506. For example, as shown in FIG. 5B, the buffer management controller 210 may limit playback quality of the second player instance by prompting streaming module 202 to reduce the size of the slices of a content item 508B that are to be allocated to Virtual Buffer 2 506.

Figure 5C:
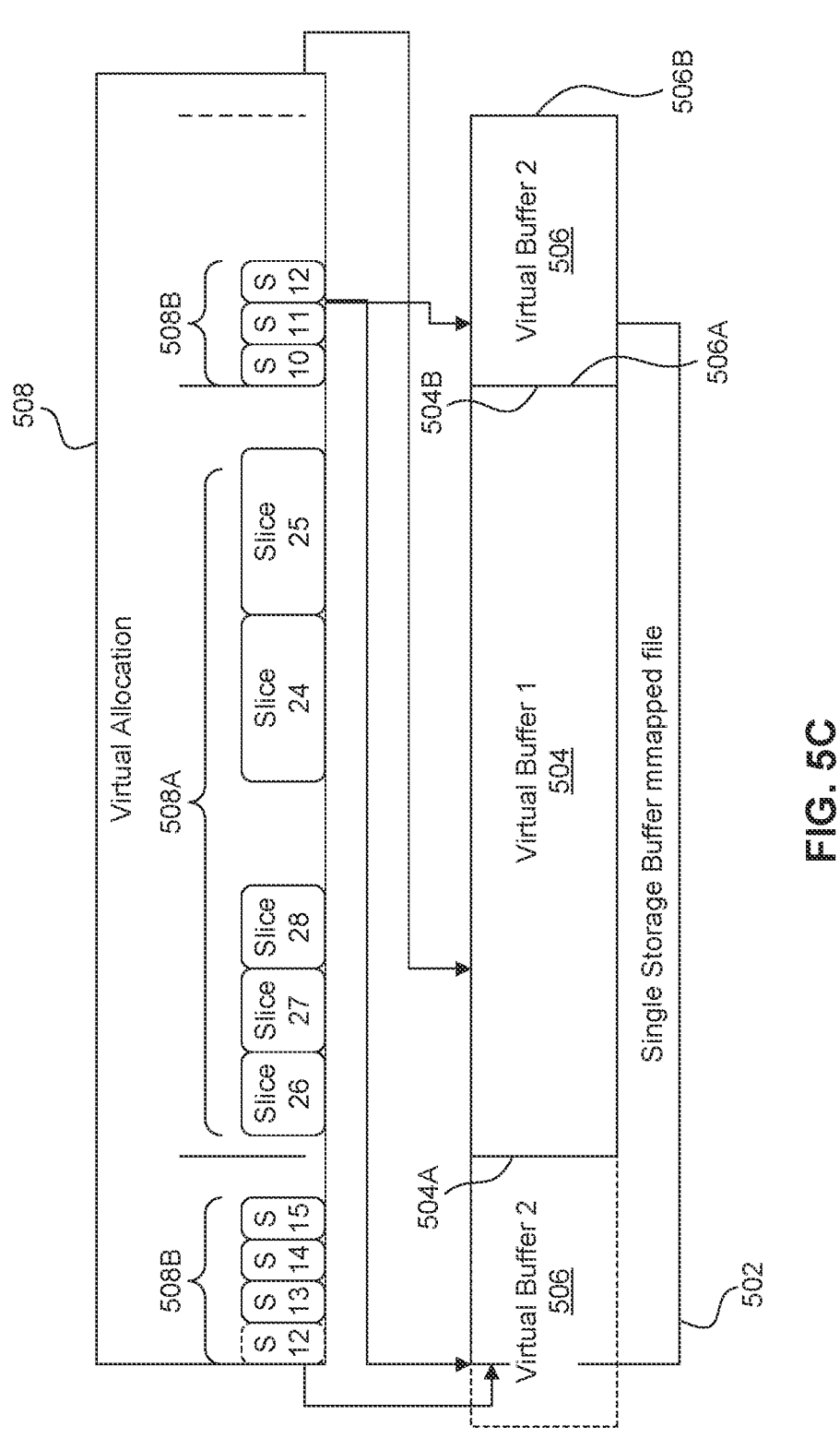

FIG. 5C illustrates a reduction in playback quality of a player instance associated with a virtual buffer, according to some embodiments of the disclosure. The buffer management controller 210 may be prompted to limit the playback quality of a player instance in response to a reduction in the size of the virtual buffer associated with the player instance. For example, in FIG. 5C, the buffer management controller 210 may ensure that a sufficient number of slices can be allocated to Virtual Buffer 1 504 by prompting streaming module 202 to reduce the size of new slices of a content item allocated to the virtual buffer (e.g., slices 26-28) as older slices (e.g., slices 22-23 in FIG. 5B) are removed from the virtual buffer when they are no longer in use or referenced by a player instance or back buffer.

Figure 5D:
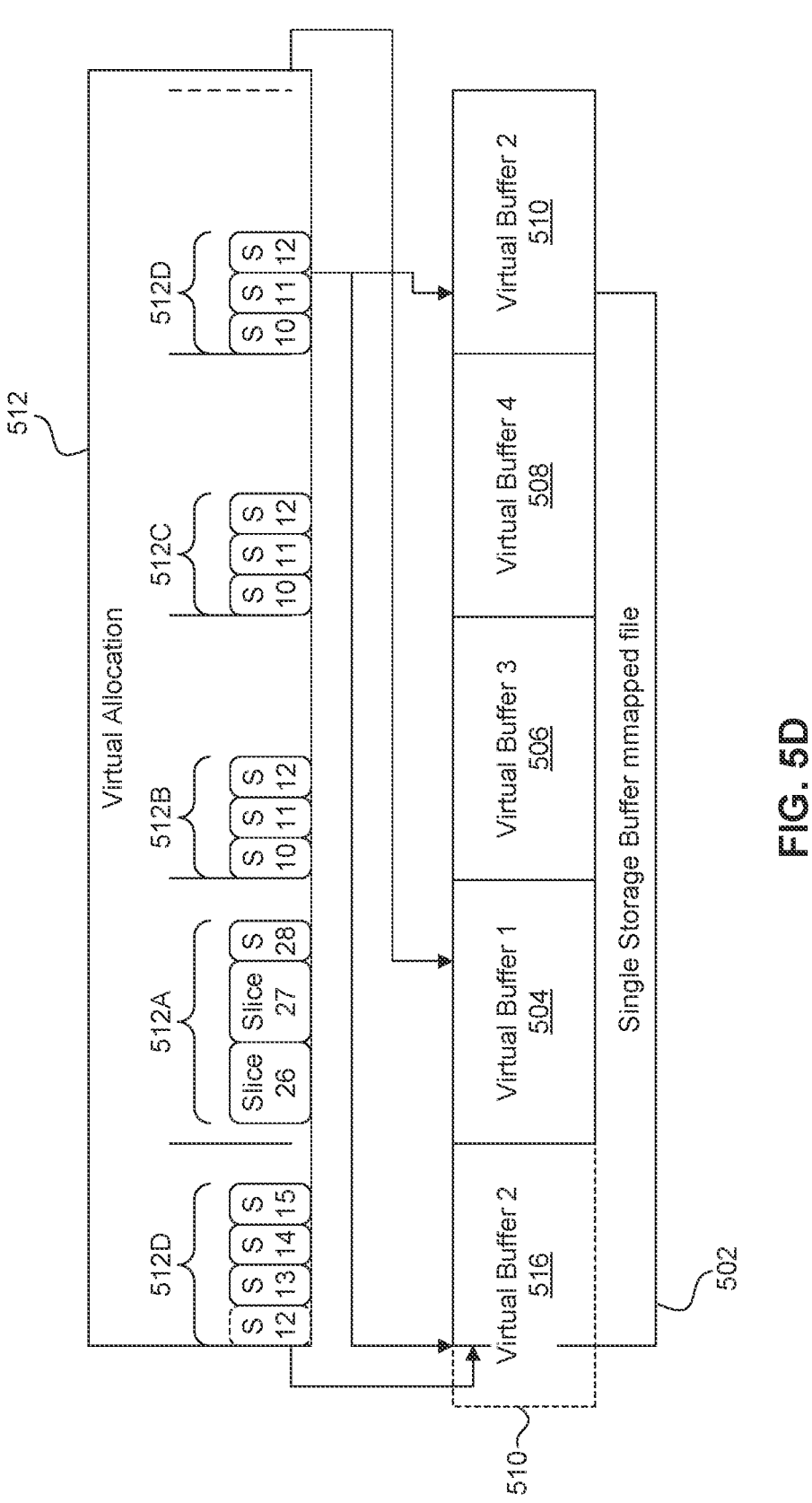

FIG. 5D illustrates the further reduction of a virtual buffer in response to request(s) to instantiate one or more additional player instances, according to some embodiments of the disclosure. For example, in FIG. 5D, as older slices of a content item (e.g., slices 24-25 in FIG. 5C) are removed from Virtual Buffer 1 504 when they are no longer in use or referenced by a player instance or back buffer, the buffer management controller 210 may further shrink or reduce the size of the virtual buffer to relinquish unused address space and update the index file to reflect the new address locations for the front and rear boundaries of the virtual buffer in the single storage buffer 502. In some cases, the buffer management controller 210 may also remove newer, not yet played slices of a content item from a virtual buffer to allow for the quick re-sizing of the virtual buffer. The buffer management controller 210 may further assign portions of the available address space in the single storage buffer 502 to Virtual Buffer 3 506 and Virtual Buffer 4 508, where Virtual Buffer 3 506 is associated with a third player instance and Virtual Buffer 4 508 is associated with a fourth player instance. As shown in FIG. 5D, the buffer management controller 210 may also limit the playback quality of the first, third, and fourth player instances by prompting streaming module 202 to limit the size of slices of content items that are to be allocated to the respective virtual buffers.

Figure 6A:
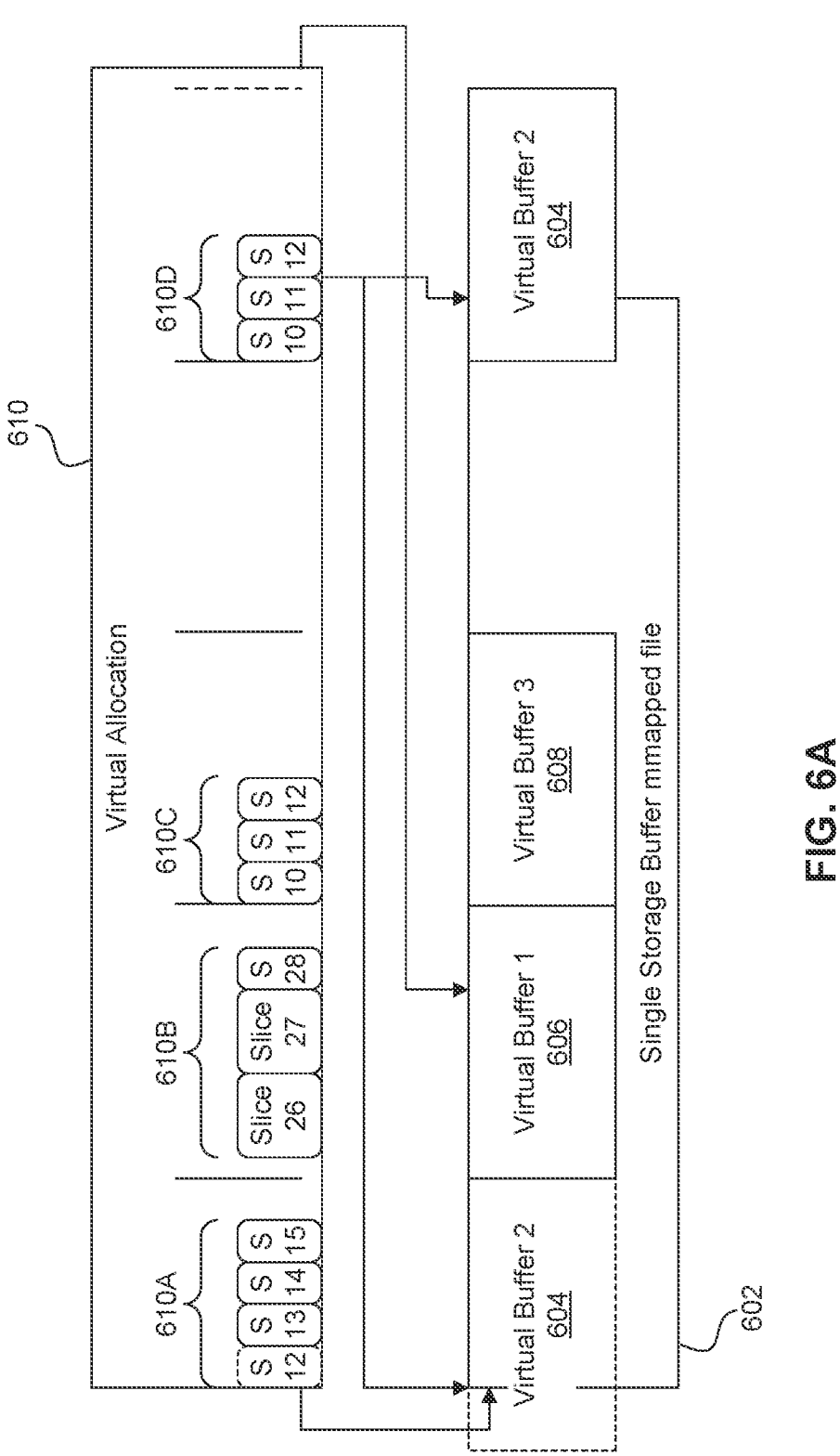
FIGS. 6A-6E illustrate block diagrams depicting a process for defragmenting a virtual buffer in single storage buffer, according to some embodiments.

FIGS. 6A-6E illustrate block diagrams depicting a process for defragmenting a virtual buffer in single storage buffer, according to some embodiments. FIG. 6A displays a single storage buffer 602 that includes three virtual buffers (e.g., Virtual Buffer 1 604, Virtual Buffer 3 606, and Virtual Buffer 2 608) and one region of available address space. As shown in FIG. 6A, each virtual buffer may encompass a portion of address space in the single storage buffer 602 and may be associated with a player instance. Furthermore, the boundaries of a virtual buffer may not align with the physical boundaries of the single storage buffer 602. For example, in FIG. 6A, Virtual Buffer 2 608 may encompass address space in regions near the front boundary 602A and rear boundary 602B of the single storage buffer 602.

Figure 6B:
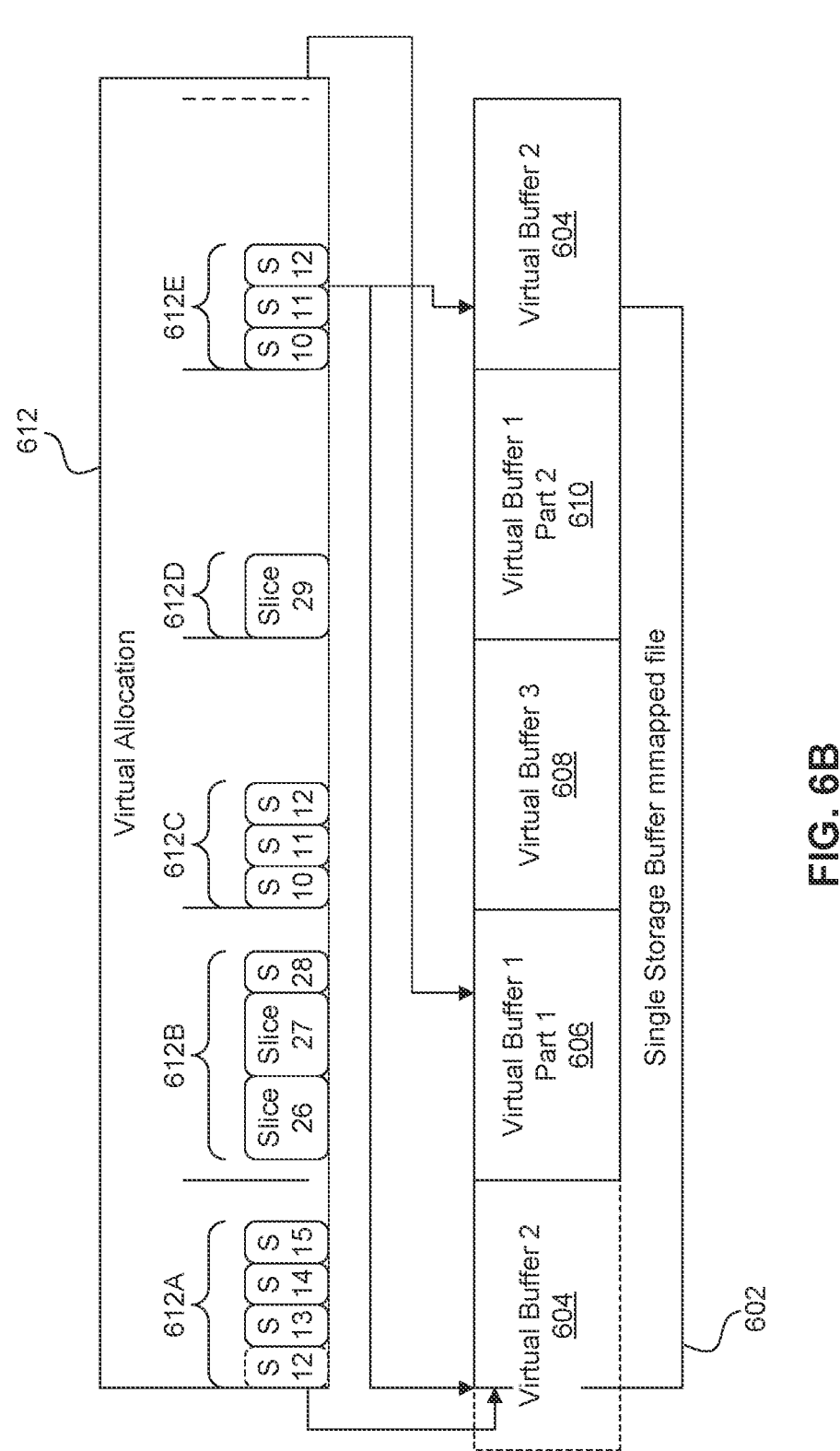

FIG. 6B illustrates a partial expansion of a virtual buffer to encompass a non-contiguous region of available address space in a single storage buffer, according to some embodiments of the disclosure. As mentioned earlier, the buffer management controller 210 may be prompted to expand a virtual buffer in response to a request to improve the playback quality of the player instance associated with the virtual buffer. In cases where there is no available address space that is adjacent to the virtual buffer, the buffer management controller 210 may expand the virtual buffer by assigning one or more non-contiguous regions of available address space in the single storage buffer 602 to the virtual buffer. For example, in FIG. 6A, Virtual Buffer 1 606 may be expanded to encompass a region of available address space between Virtual Buffer 3 608 and Virtual Buffer 2 604 in the single storage buffer 602. As shown in FIG. 6B, Virtual Buffer 1 (element 606 in FIG. 6A) may become fragmented due to the expansion because it now includes Virtual Buffer 1 Part 1 606 and Virtual Buffer 1 Part 2 610, which are non-contiguous regions of address space in single storage buffer 602. Nevertheless, the buffer management controller 210 and the player instance associated with Virtual Buffer 1 may treat Virtual Buffer 1 Part 1 606 and Virtual Buffer 1 Part 2 610 as if they were a single contiguous buffer. For example, as shown in FIG. 6B, the buffer management controller 210 may allocate slices of a content item (e.g., slices 26-29) across Virtual Buffer 1 Part 1 606 and Virtual Buffer 1 Part 2 610 in order according to their sequence numbers. Alternatively, in other embodiments, Virtual Buffer 1 may have its own logic or software code to allocate slices of a content item (e.g., slices 26-29) across Virtual Buffer 1 Part 1 606 and Virtual Buffer 1 Part 2 610. The first player instance associated with Virtual Buffer 1 may also subsequently send the stored slices of the content item to display device 108 in order according to their sequence numbers.

Figure 6C:
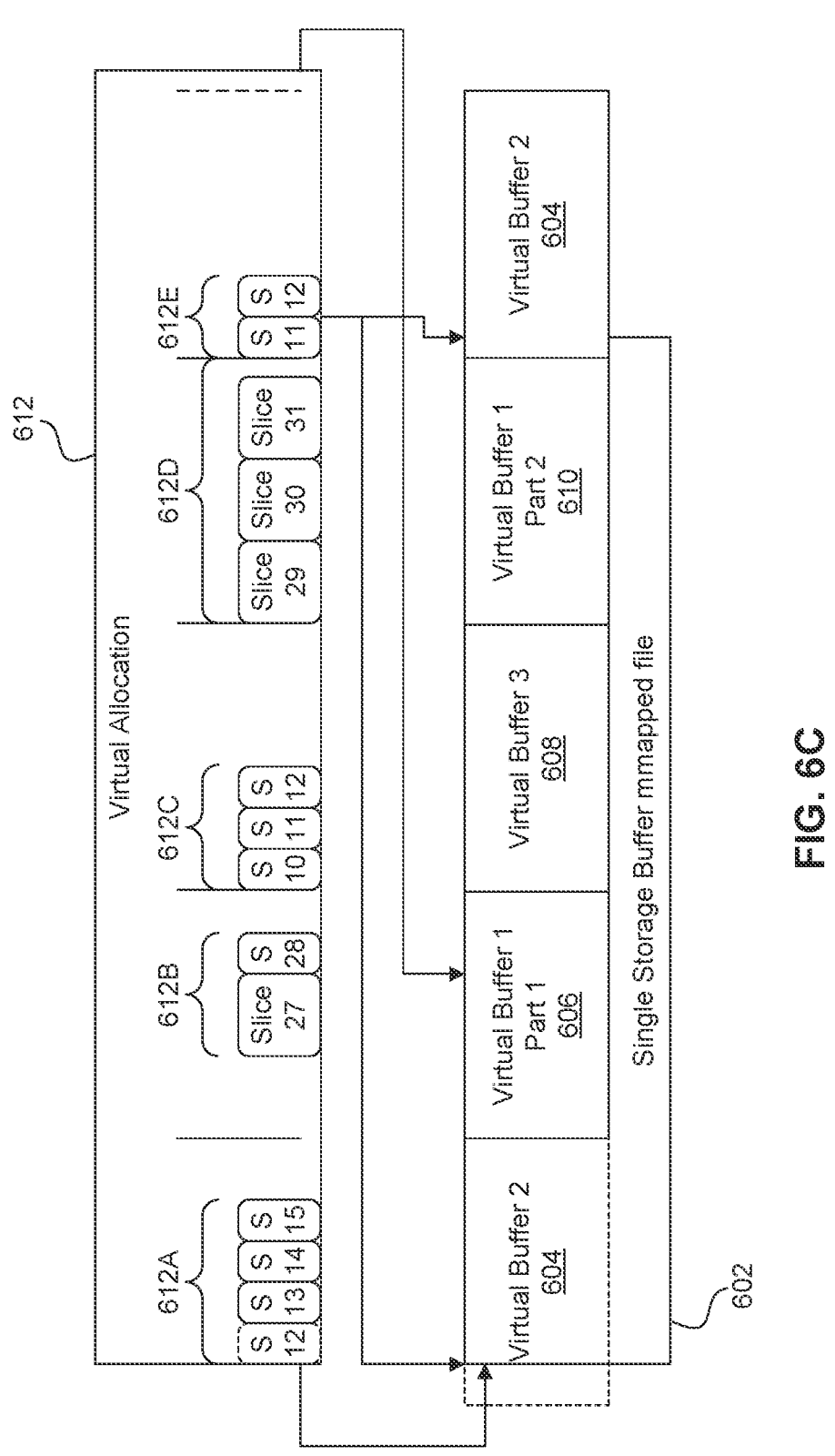
Figure 6D:
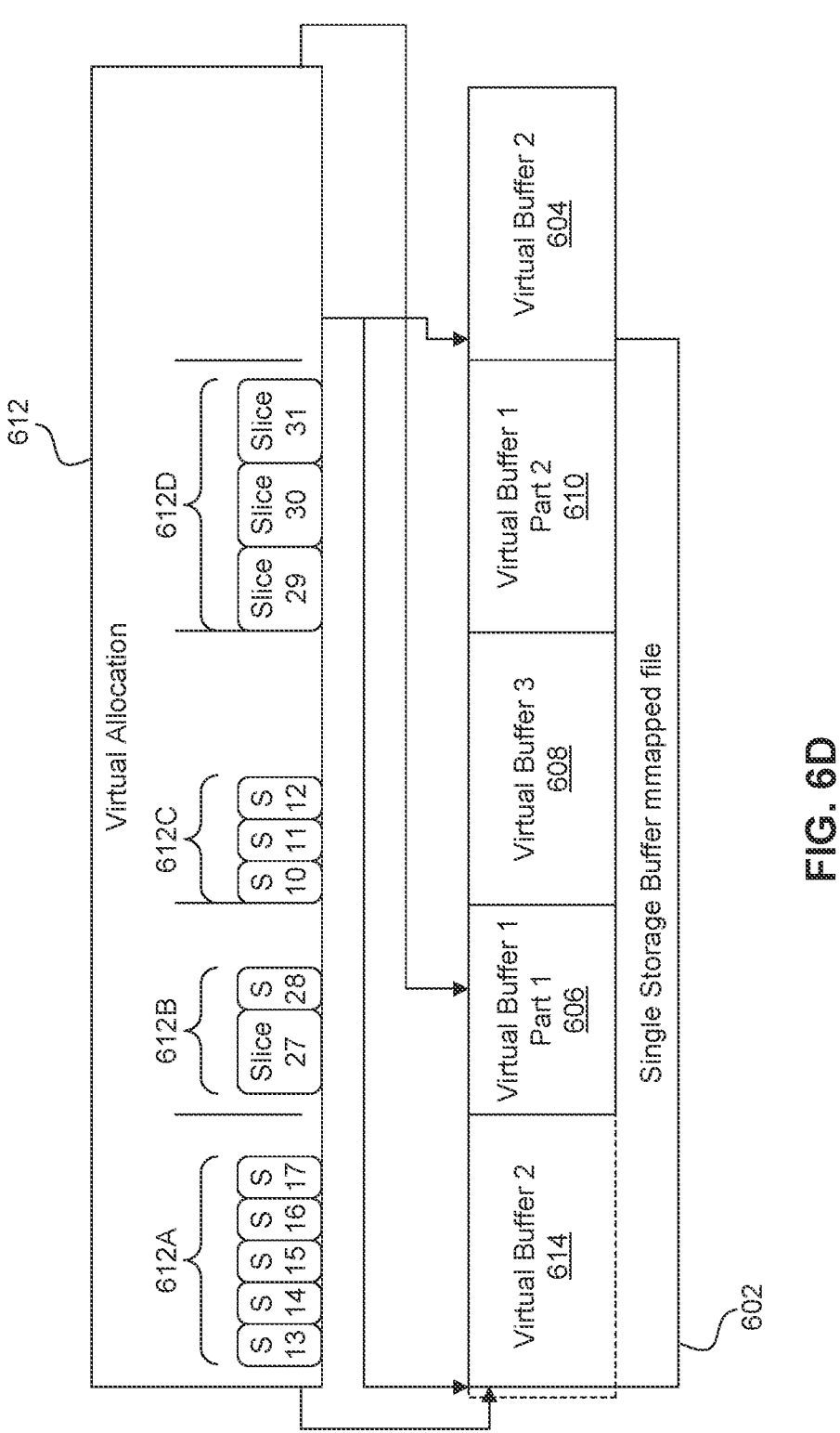
Figure 6E:
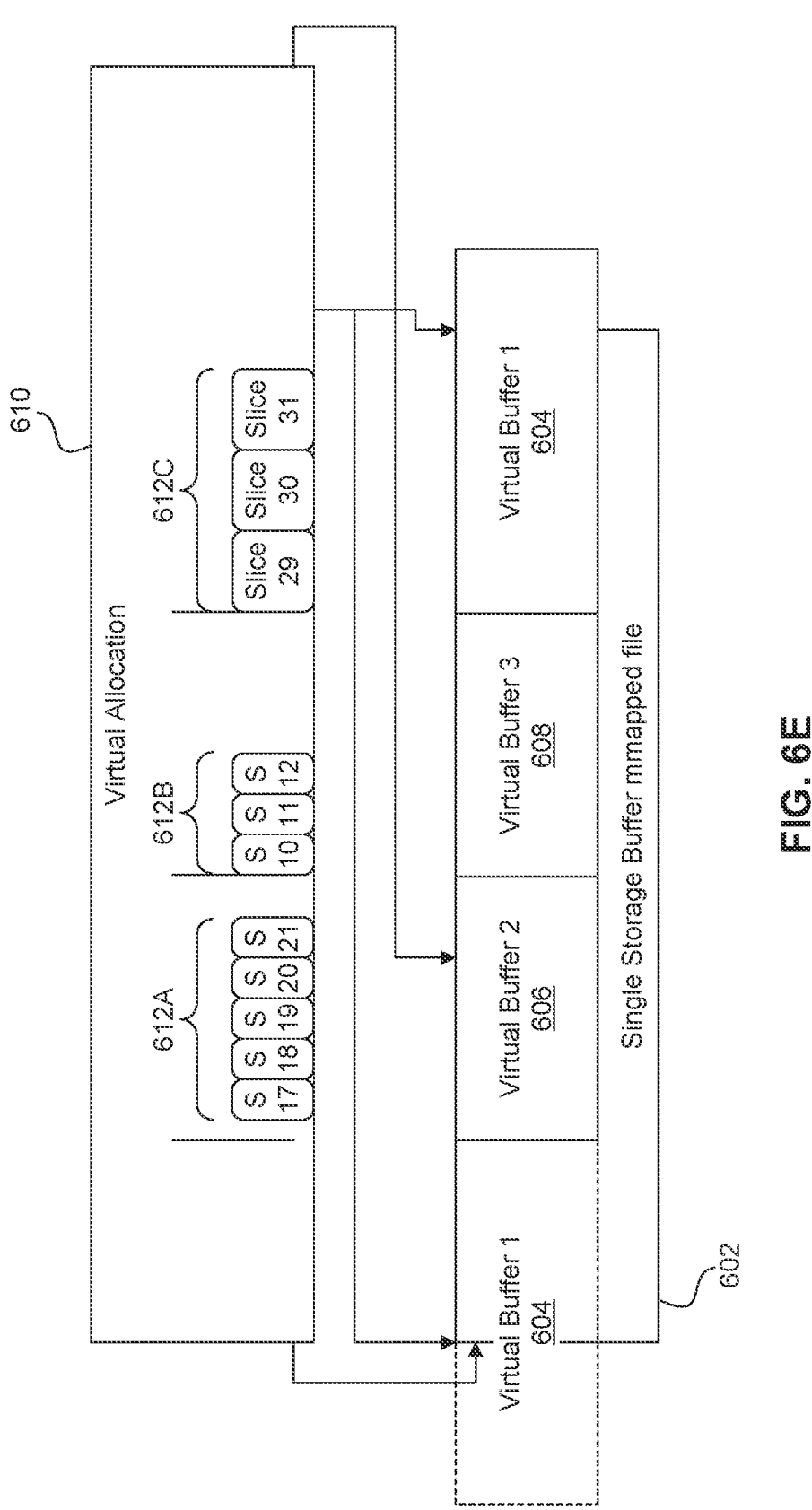

FIGS. 6C, 6D, and 6E illustrate the defragmentation of Virtual Buffer 1 (element 606 in FIG. 6A), according to some embodiments. As shown in FIG. 6C, the buffer management controller 210 may identify a fragmented virtual buffer that includes two or more non-contiguous regions of address space in single storage buffer 602. For example, in FIG. 6C, the buffer management controller 210 may select Virtual Buffer 1 as a fragmented virtual buffer because it comprises a Virtual Buffer 1 Part 1 606 and a Virtual Buffer 1 Part 2 610. The buffer management controller 210 may identify one of the two or more non-contiguous regions of the fragmented virtual buffer as a target contiguous region. The target contiguous region may be identified based on the sequence numbers of slices of a content item stored in the two or more non-contiguous regions of the fragmented virtual buffer. For example, the target contiguous region may be the region that stores the slice of a content item having the latest sequence number in the set of slices allocated to the fragmented virtual buffer. For example, in FIG. 6C, the buffer management controller 210 may designate Virtual Buffer 1 Part 2 610 as the target contiguous region because it is the region of the virtual buffer that stores the most recent slice of the content item (e.g., slice 31). The buffer management controller 210 may also identify an eliminated region from the remaining region(s) of the two or more non-contiguous regions of the fragmented virtual buffer. The eliminated region may be one of the remaining regions mapped to the fragmented virtual buffer that is closest to (i.e., shortest distance from) the target contiguous region in the single storage buffer. For example, in some embodiments, the buffer management controller 210 may designate Virtual Buffer 1 Part 1 606 as the eliminated region since it is the only remaining region of the Virtual Buffer 1 as shown in FIG. 6C. Alternatively, in other embodiments, the virtual buffer may include additional logic or software configured to allow it to identify a target contiguous region and an eliminated region based on the aforementioned criteria in response to a query from buffer management controller 210.

As shown in FIG. 6D, the buffer management controller 210 may consolidate the eliminated region (e.g., Virtual Buffer 1 Part 1 606) with the target contiguous region (e.g., Virtual Buffer 1 Part 2) in the single storage buffer. The buffer management controller 210 may determine the consolidation direction (i.e., the direction of regions' movement in the single storage buffer as they extend or shrink) based on the shortest distance between the determined target contiguous region and the eliminated region. In some embodiments, the buffer management controller 210 may determine the consolidation direction flows right when shortest distance occurs between the rear boundary of the target contiguous region and the front boundary of the eliminated region, and the consolidation direction flows left when the shortest distance occurs between the front boundary of the target contiguous region and the rear boundary of the eliminated region. Alternatively, in other embodiments, the buffer management controller 210 may determine the consolidation direction using other criteria (e.g., the number of regions between the target contiguous region and the eliminated region) in lieu of, or in addition to, the shortest distance between target contiguous region and the eliminated region.

The buffer management controller 210 may also identify at least one moving region mapped to one or more other virtual buffers between the target contiguous region and the eliminated region along the determined consolidation direction. For example, in FIG. 6D, the buffer management controller 210 may determine the consolidation direction flows right because the shortest distance between the target contiguous region (e.g., Virtual Buffer 1 Part 2 610) and the eliminated region (e.g., Virtual Buffer 1 Part 1 606) occurs between the rear boundary of Virtual Buffer 1 Part 2 610 and the front boundary of Virtual Buffer 1 Part 1 606. As shown in FIG. 6D, the buffer management component 210 may also identify Virtual Buffer 2 604 as a moving region between the target contiguous region and the eliminated region along the determined consolidation direction.

Furthermore, the buffer management controller 210 may shrink or reduce the size of the eliminated region by shifting at least one boundary of the eliminated region along the consolidation direction as one or more slices of a content item are removed. For example, as shown in FIGS. 6C and 6D, the buffer management controller 210 may gradually shrink Virtual Buffer 1 Part 1 606 as slices of the content item (e.g., slice 26 in FIG. 6B) are removed from Virtual Buffer 1 Part 1 606. The buffer management controller 210 may shrink the Virtual Buffer 1 Part 1 606 by advancing the front boundary 606A of the region right towards its rear boundary 606B. The buffer management controller 210 may continue to shrink Virtual Buffer 1 Part 1 606 until the address space previously used by Virtual Buffer 1 Part 1 606 has been relinquished to the single storage buffer 602. Alternatively, the buffer management controller 210 may wait until Virtual Buffer 1 Part 1 606 is completely empty before relinquishing the address space back to the single storage buffer 602. The buffer management controller 210 may further unmap the region of address space occupied by Virtual Buffer 1 Part 1 606 from the virtual buffer by deleting the address locations for the front and rear boundaries of the region from the index file.

Simultaneous (or substantially simultaneous) to shrinking the eliminated region, the buffer management controller 210 may shift the boundaries of the at least one moving region along the consolidation direction to encompass address space in the single storage buffer 602 previously used by the eliminated region. For example, as shown in FIGS. 6C and 6D, the buffer management controller 210 may shift Virtual Buffer 2 604 to the right by extending the rear boundary 604B and shrinking the front boundary 604A by an amount corresponding to the extension of the rear boundary 604B. The buffer management controller 210 may also update the index file to reflect the new address locations in the single storage buffer for the front boundary 604A and rear boundary 604B of Virtual Buffer 2 604 in the index file.

The buffer management controller 210 may further extend the target contiguous region by shifting at least one boundary of the target contiguous region along the consolidation direction to encompass address space in the single storage buffer previously used by the at least one moving region. For example, as shown in FIG. 6D, the buffer management controller 210 may shift the rear boundary 604B of Virtual Buffer 1 Part 2 610 right to encompass address space previously used by Virtual Buffer 2 604. The extension Virtual Buffer 1 Part 2 610 in FIG. 6D may result in a newly contiguous Virtual Buffer 1 604 in FIG. 6E. The buffer management controller 210 may further update the index file to reflect the new address locations for the front boundary 604A and rear boundary 604B of the contiguous Virtual Buffer 1 604 in FIG. 6E. In some cases, consolidating Virtual Buffer 1 Part 2 610 (i.e., the target contiguous region) with Virtual Buffer 1 Part 1 606 (i.e., the eliminated region) may result in Virtual Buffer 1 604 in FIG. 6E having a maximum capacity as originally established in FIG. 6B. Finally, as shown in FIG. 6E, the boundaries of Virtual Buffer 1 604 do not have to align with the physical boundaries of the single storage buffer 602.

Figure 9:
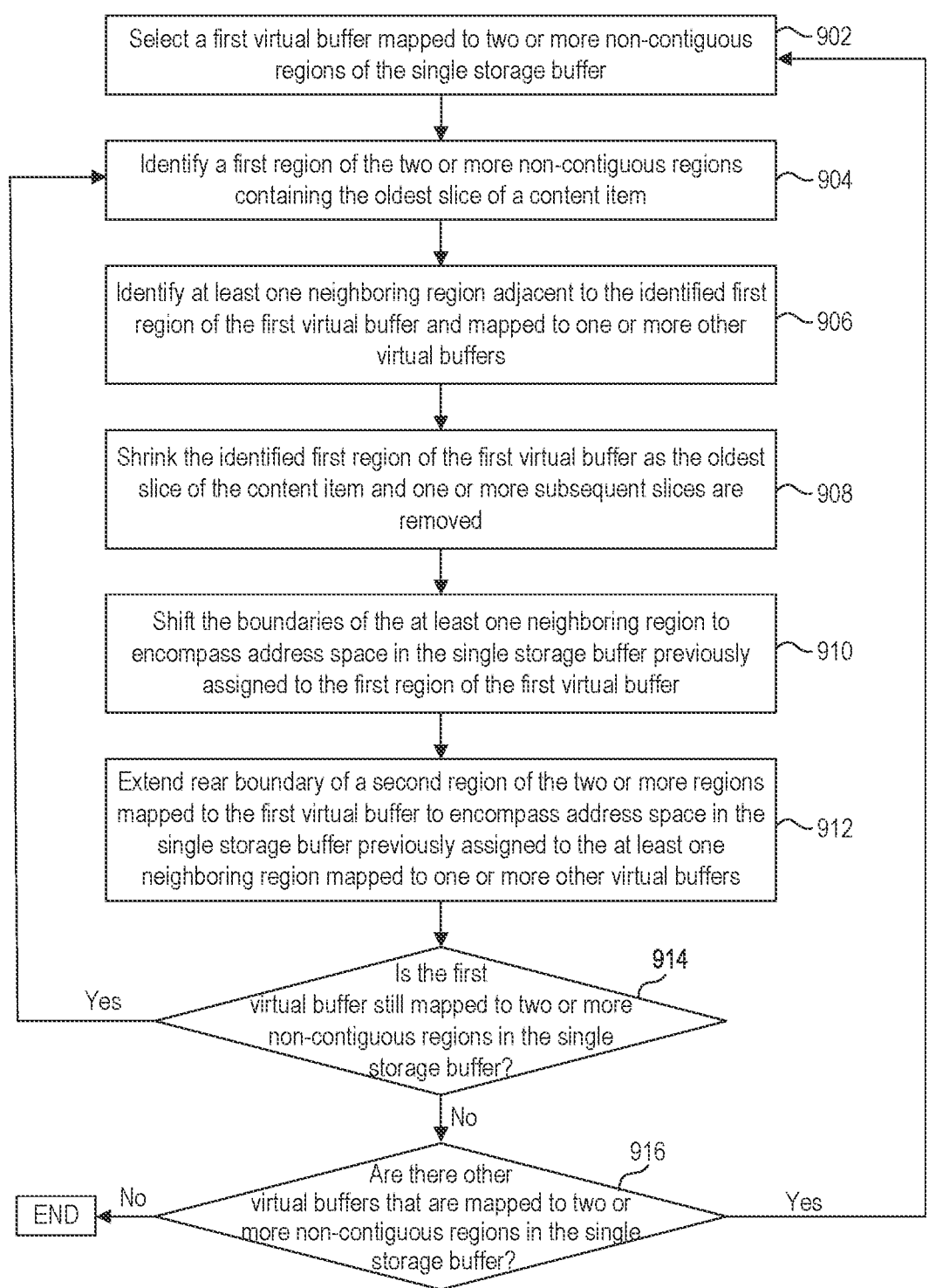
FIG. 9 illustrates a flowchart for defragmenting a virtual buffer in a single storage buffer, according to some embodiments.

FIGS. 7-9 further illustrate aspects of a method for utilizing a single storage buffer for a dynamic number of players, where each player is assigned and uses a dynamically sized buffer, according to some embodiments.

FIG. 7 is a flow chart of an example method 700 for creating a virtual buffer, according to some embodiments. Method 700 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Method 700 shall be described with reference to FIGS. 1, 2, 4A-4D, and 5A-5D. However, method 700 is not limited to that embodiment.

At 702, a request to initiate at least one player instance for displaying a content item is received. For example, the buffer management controller 210 of media device 106 may receive the request to initiate at least one player instance for displaying the content item. In some embodiments, the request to initiate a player instance may be made upon the initiation of media device 106 or the startup of a content-streaming application or data source.

At 704, a virtual buffer having a maximum capacity for the at least one player instance is created. In some embodiments, the buffer management controller 210 may dynamically configure the maximum capacity of the virtual buffer based on one or more factors, including but not limited to, a number of existing virtual buffers, total capacity of the single storage buffer, a maximum amount of player instances that can be initiated at a given time, one or more quality requirements for the at least one player instance, the amount of address space necessary to allocate a sufficient number of slices of content to the virtual buffer, or the like.

At 706, one or more available regions in the single storage buffer are identified. In some embodiments, the one or more available regions in the single storage buffer may include address space that has not been assigned or mapped to an existing virtual buffer. Additionally, or alternatively, the one or more available regions in the single storage buffer may include unused or under-utilized address space mapped to one or more other virtual buffers. For example, as depicted in FIGS. 5A-5D, the buffer management controller 210 may shrink the one or more other virtual buffers (e.g., Virtual Buffer 1 504 in FIG. 5B) to relinquish the unused or under-utilized address space back to the single storage buffer 502.

At 708, the address space in the one or more available regions of the single storage buffer is evaluated to determine whether the address space is sufficient to accommodate the newly created virtual buffer. In some embodiments, the buffer management controller 210 may determine that the one or more available regions are sufficient to accommodate the newly created virtual buffer by determining whether the address space in the one or more available regions exceeds or matches the maximum capacity of the virtual buffer.

At 710, the virtual buffer is mapped or assigned to the one or more available regions of the single storage buffer in response to determining that the one or more available regions are sufficient to accommodate the virtual buffer. The buffer management controller 210 may map the virtual buffer to the one or more available regions in the single storage buffer by recording the address locations for the front boundary and rear boundary of the virtual buffer in an index file. For example, as depicted in FIGS. 4A-4D, the buffer management controller 210 may map Virtual Buffer 1 404 to a region corresponding to the dynamically configured maximum capacity of the virtual buffer in single storage buffer 402 and record the address locations for the front boundary 404A and rear boundary 404B of the virtual buffer in an index file. If the buffer management controller 210 determines that the address space in the one or more available regions is less than the maximum capacity of the virtual buffer, the buffer management controller 210 may temporarily reduce the maximum capacity of the virtual buffer to a level matching the capacity of the one or more available regions according to some embodiments. The buffer management controller 210 may further map the reduced virtual buffer to the one or more available regions. Alternatively, in other embodiments, the buffer management controller 210 may wait to map the virtual buffer until a sufficient amount of address space becomes available in the single storage buffer 402.

FIG. 8 is a flowchart of an example method 800 for storing portions of content items in a virtual buffer, according to some embodiments. Method 800 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art. Method 800 shall be described with reference to FIGS. 1 and 2. However, method 800 is not limited to that embodiment.

At 802, a memory allocation request from the at least one player instance is received. For example, the buffer management controller 210 receives the memory allocation request (e.g., selection of a content item for playback) from the at least one player instance.

At 804, a subset of a plurality of slices of a content item is received from a data source. Each slice of the content item may be a data packet comprising a header, a payload, a status indicator, time stamp, and other metadata. Furthermore, in some embodiments, the buffer management controller 210 may prompt streaming module 202 to adjust the size of each slice of the content item based, at least in part, on one or more of factors including, but not limited to, a number of existing virtual buffers, a total capacity of the single storage buffer, a maximum amount of player instances that can be initiated at a given time, the amount of address space necessary to allocate a sufficient number of slices of a content item to the virtual buffer to enable display by a display device, and one or more playback requirements for at least one player instance, or the like.

At 806, the status of at least one previously allocated slice of the content item in the virtual buffer associated with the at least one player instance is determined. In some embodiments, the buffer management controller 210 may determine the status of a previously allocated slice of the content item based on a status indicator assigned to the slice.

At 808, the at least one previously allocated slice of the content item is removed from the virtual buffer in response to determining that the status of the at least one previously allocated slice of the content item indicates that the at least one previously allocated slice is not referenced or in use. For example, the buffer management controller 210 may remove the at least one previously allocated slice of the content item from the virtual buffer if the at least one previously allocated slice of the content item has been played out to display device 108 or is not being used or referenced by a player instance or a back buffer.

At 810, the received subset of the plurality of slices of the content item is allocated to the virtual buffer. For example, the buffer management controller 210 allocates the received subset of the plurality of slices of the content item to the virtual buffer.

Furthermore, in alternative embodiments, a virtual buffer may include its own logic or software code that enables the virtual buffer to manage data stored in the one or more mapped regions of the single storage buffer 302. In such alternative embodiments, the virtual buffer(s), in lieu of the buffer management controller 210, may perform steps 802, 804, 806, 808, and 810.

FIG. 9 illustrates a flowchart of an example method 900 for defragmenting a virtual buffer in a single storage buffer, according to some embodiments. Method 900 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art. Method 900 shall be described with reference to FIGS. 1, 2, and 6A-6E. However, method 900 is not limited to that embodiment.

At 902, a first virtual buffer mapped to two or more non-contiguous regions of the single storage buffer is selected. For example, as shown in FIG. 6B, the buffer management controller 210 may identify a fragmented virtual buffer that includes two or more non-contiguous portions of address space in a single storage buffer 602. In this case, the buffer management controller 210 may identify Virtual Buffer 1, which includes Virtual Buffer 1 Part 1 606 and Virtual Buffer 1 Part 2 610, as a fragmented virtual buffer.

At 904, a target contiguous region and an eliminated region are identified in the two or more non-contiguous regions mapped to the identified fragmented virtual buffer. The target contiguous region may be identified based on the sequence numbers of slices of a content item stored in the two or more non-contiguous regions. The target contiguous region may be a region that stores the slice of a content item having the latest sequence number in the set of slices allocated to the fragmented virtual buffer. For example, as shown in FIG. 6C, the buffer management controller 210 may identify Virtual Buffer 1 Part 2 610 as the target contiguous region because it stores the most recent slice of a content item (e.g., slice 31). The eliminated region may be one of the remaining regions mapped to the fragmented virtual buffer that is closest to (i.e., shortest distance from) the target contiguous region in the single storage buffer. For example, in FIG. 6C, the buffer management controller 210 may identify Virtual Buffer 1 Part 1 606 as the eliminated region as it is the only remaining region of the Virtual Buffer 1.

At 906, a consolidation direction is determined based on the shortest distance between the target contiguous region and the eliminated region. In some embodiments, the consolidation direction flows right when the shortest distance occurs between the rear boundary of the target contiguous region and the front boundary of the eliminated region, while the consolidation direction flows left when the shortest distance occurs between the front boundary of the target contiguous region and the rear boundary of the eliminated region. For example, in FIG. 6D, the buffer management controller 210 may determine that the consolidation direction flows right because the shortest distance between the target contiguous region and the eliminated region occurs between the rear boundary of Virtual Buffer 1 Part 2 610 and the front boundary of Virtual Buffer 1 Part 1 606.

At 908, at least one moving region mapped to one or more other virtual buffers is identified along the consolidation direction between the target contiguous region and the eliminated region. For example, in FIG. 6D, the buffer management component 210 may identify Virtual Buffer 2 604 as a moving region between the target contiguous region and the eliminated region along the determined consolidation direction.

At 910, the eliminated region may shrink or be reduced by shifting at least one boundary of the eliminated region along the consolidation direction as one or more slices of a content item are removed from the eliminated region. For example, subsequent to determining that the consolidation direction is right, the buffer management controller 210 may shrink Virtual Buffer 1 Part 1 606 by shifting the front boundary of the region 606A right towards its rear boundary 606B as one or more slices of the content item are removed from the eliminated region as shown in FIG. 6C. Furthermore, the buffer management controller 210 may continue to shrink Virtual Buffer 1 Part 1 606 until the address space previously encompassed by the region has been relinquished to the single storage buffer 602. Alternatively, in other embodiments, the buffer management controller 210 may wait until Virtual Buffer 1 Part 1 606 is empty before shifting the front boundary 606A and relinquishing the address space back to the single storage buffer. Furthermore, the buffer management controller 210 may unmap the region of address space occupied by Virtual Buffer 1 Part 1 606 in the fragmented virtual buffer by deleting the address locations for its front and rear boundaries from the index file.

At 912, the boundaries of the at least one moving regions are shifted to encompass the address space in the single storage buffer previously assigned to the eliminated region. For example, as shown in FIG. 6D, the buffer management controller 210 may shift Virtual Buffer 2 604 (i.e., the at least one identified moving region) by extending its rear boundary 604B right to encompass address space previously used by Virtual Buffer 1 Part 1 606 and advancing the front boundary 604A right towards the rear boundary 604B by an amount corresponding to the initial extension of the rear boundary 604B. Furthermore, the buffer management controller 210 may update the index file to reflect the new address locations for the front boundary 604A and rear boundary 604B of Virtual Buffer 2 604 in the single storage buffer 602.

At 914, the target contiguous region is extended by shifting at least one boundary of the target contiguous region to encompass address space in the single storage previously assigned to the at least one moving region. For example, as shown in FIG. 6D, the buffer management controller 210 may extend the rear boundary 610B of Virtual Buffer 1 Part 2 610 right to encompass address space in the single storage buffer 602 that was previously used by Virtual Buffer 2 604. Furthermore, the buffer management controller 210 may update the index file to reflect the new address location for the rear boundary 610B of Virtual Buffer 1 Part 2 610 in the single storage buffer 602.

At 916, the buffer management controller 210 may determine if the first virtual buffer remains mapped to two or more non-contiguous regions in the single storage buffer. If the first virtual buffer remains mapped to two or more non-contiguous regions in the single storage buffer, the buffer management controller 210 may identify a target contiguous region and an eliminated region from the two or more non-contiguous regions and repeat operations 906, 908, 910, 912, and 914. If the buffer management controller 210 determines that the first virtual buffer comprises one contiguous region of address space in the single storage buffer, the method 900 may include proceeding to operation 918.

At 918, the buffer management controller 210 may determine if there are other virtual buffers that are mapped to two or more non-contiguous regions of address space in the single storage buffer. If there are other virtual buffers that are mapped to two or more non-contiguous regions of address space in the single storage buffer, the buffer management controller 210 may identify another virtual buffer mapped to two or more non-contiguous regions of the single storage buffer and repeat operations 904, 906, 908, 910, 912, 914, 916, and 918. If the buffer management controller 210 determines that the single storage buffer does not include other fragmented virtual buffers, the method 900 may terminate.

Although the embodiments disclosed herein are discussed with respect to players or player instances that are configured to output content items, the embodiments of this disclosure can be used for any sequentially-processing buffer-requiring component or device. Additionally, the embodiments of this disclosure may be used by operating systems to allow pre-buffering of different content items and switching from one content item to another using a single player.

Example Computer System

Figure 10:
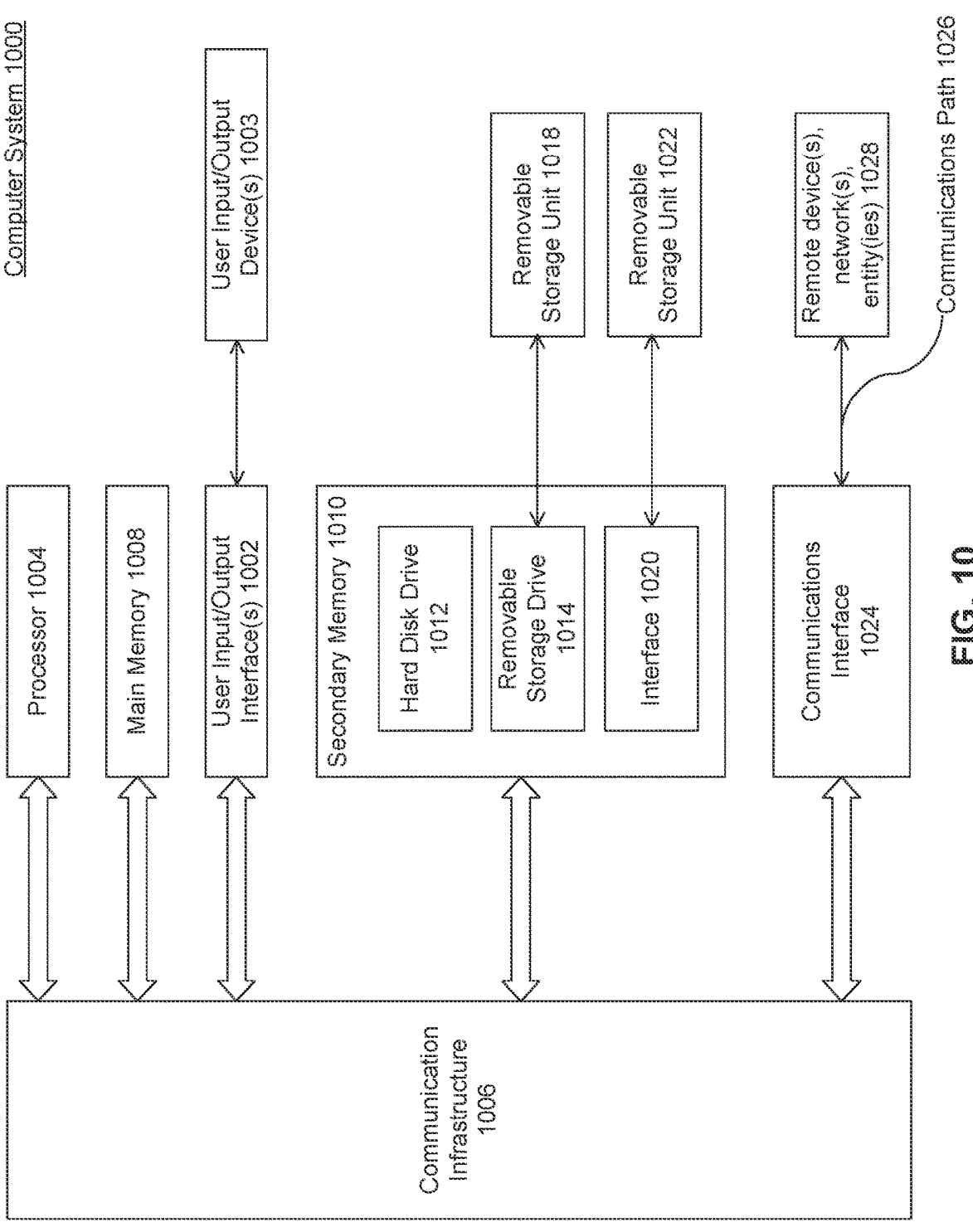
FIG. 10 illustrates an example computer system useful for implementing various embodiments.

Various embodiments may be implemented, for example, using one or more well-known computer systems, such as computer system 1000 shown in FIG. 10. For example, the media device 106 may be implemented using combinations or sub-combinations of computer system 1000. Also or alternatively, one or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for utilizing a single storage buffer for a dynamic amount of dynamically sized virtual buffers, comprising:

receiving, by a buffer management controller, a request to initiate at least one player for displaying a content item, wherein the at least one player is a component configured to output content items;

creating, by the buffer management controller, a virtual buffer having a maximum capacity for the at least one player, wherein the maximum capacity of the virtual buffer is determined based on at least one of: a number of existing virtual buffers, a total capacity of the single storage buffer, a maximum amount of players that can be initiated at a given time, and one or more quality requirements for the at least one player;

identifying, by the buffer management controller, one or more available regions in the single storage buffer;

mapping, by the buffer management controller, the virtual buffer to the one or more available regions in response to determining that the one or more available regions are sufficient to accommodate the virtual buffer; and consolidating, by the buffer management controller, two or more non-contiguous regions mapped to the virtual buffer into a single contiguous region of the single storage buffer by at least shrinking a first non-contiguous region of the two or more non-contiguous regions by shifting at least one boundary of the first non-contiguous region along a consolidation direction, wherein the consolidation direction is determined based on a shortest distance between the first non-contiguous region and another non-contiguous region of the two or more non-contiguous regions.

2. The computer-implemented method of claim 1, wherein the determining that the one or more available regions in the single storage buffer are sufficient to accommodate the virtual buffer further comprises:

determining, by the buffer management controller, that address space in the one or more available regions of the single storage buffer exceeds or is equal to the maximum capacity of the virtual buffer.

3. The computer-implemented method of claim 1, further comprising:

receiving, by the buffer management controller, a memory allocation request from the at least one player;

receiving, by the buffer management controller, a subset of a plurality of slices of the content item from a data source; and storing, by the buffer management controller, the subset of the plurality of slices of the content item in one or more regions of the single storage buffer mapped to the virtual buffer associated with the at least one player.

4. The computer-implemented method of claim 3, further comprising:

prior to storing the subset of the plurality of slices of the content item, determining, by the buffer management controller, a status of at least one previously stored slice of the content item; and removing, by the buffer management controller, the at least one previously stored slice of the content item from the virtual buffer in response to determining that the status indicates that the at least one previously stored slice of the content item is not in use.

5. The computer-implemented method of claim 1, further comprising:

selecting, by the buffer management controller, a first virtual buffer mapped to the two or more non-contiguous regions of the single storage buffer, wherein the first virtual buffer is the virtual buffer; and consolidating, by the buffer management controller, the two or more non-contiguous regions mapped to the first virtual buffer into the single contiguous region of the single storage buffer; and mapping, by the buffer management controller, the first virtual buffer to the single contiguous region of the single storage buffer.

6. The computer-implemented method of claim 5, wherein the consolidating further comprises:

identifying, by the buffer management controller, a target contiguous region and an eliminated region from the two or more non-contiguous regions;

determining, by the buffer management controller, the consolidation direction based on the shortest distance between the target contiguous region and the eliminated region;

identifying, by the buffer management controller, a moving region mapped to a second virtual buffer between the target contiguous region and the eliminated region along the consolidation direction;

shrinking, by the buffer management controller, the eliminated region by shifting at least one boundary of the eliminated region along the consolidation direction as one or more slices of the content item are removed from the eliminated region;

unmapping, by the buffer management controller, the eliminated region from the first virtual buffer;

shifting, by the buffer management controller, boundaries of the moving region along the consolidation direction to encompass address space in the single storage buffer previously used by the eliminated region; and extending, by the buffer management controller, at least one boundary of the target contiguous region along the consolidation direction to encompass address space in the single storage buffer previously used by the moving region.

7. The computer-implemented method of claim 6, wherein the shifting further comprises:

extending, by the buffer management controller, a first boundary of the moving region along the consolidation direction to encompass the address space in the single storage buffer previously used by the eliminated region; and shrinking, by the buffer management controller, a second boundary of the moving region along the consolidation direction by an amount corresponding to the extension of the first boundary.

8. A system for utilizing a single storage buffer for a dynamic amount of dynamically sized virtual buffers, comprising:

one or more memories; and at least one processor each coupled to at least one of the memories and configured to perform operations comprising:

receiving, by a buffer management controller, a request to initiate at least one player for displaying a content item, wherein the at least one player is a component configured to output content items;

creating, by the buffer management controller, a virtual buffer having a maximum capacity for the at least one player, wherein the maximum capacity of the virtual buffer is determined based on at least one of: a number of existing virtual buffers, a total capacity of the single storage buffer, a maximum amount of players that can be initiated at a given time, and one or more quality requirements for the at least one player;

identifying, by the buffer management controller, one or more available regions in the single storage buffer;

mapping, by the buffer management controller, the virtual buffer to the one or more available regions in response to determining that the one or more available regions are sufficient to accommodate the virtual buffer; and consolidating, by the buffer management controller, two or more non-contiguous regions mapped to the virtual buffer into a single contiguous region of the single storage buffer by at least shrinking a first non-contiguous region of the two or more non-contiguous regions by shifting at least one boundary of the first non-contiguous region along a consolidation direction, wherein the consolidation direction is determined based on a shortest distance between the first non-contiguous region and another non-contiguous region of the two or more non-contiguous regions.

9. The system of claim 8, wherein the determining that the one or more available regions of the single storage buffer are sufficient to accommodate the virtual buffer comprises:

determining, by the buffer management controller, that address space in the one or more available regions of the single storage buffer exceeds or is equal to the maximum capacity of the virtual buffer.

10. The system of claim 8, the operations further comprising:

receiving, by the buffer management controller, a memory allocation request from the at least one player;

receiving, by the buffer management controller, a subset of a plurality of slices of the content item from a data source; and storing, by the buffer management controller, the subset of the plurality of slices of the content item in one or more regions of the single storage buffer mapped to the virtual buffer associated with the at least one player.

11. The system of claim 10, the operations further comprising:

prior to storing the subset of the plurality of slices of the content item, determining, by the buffer management controller, a status of at least one previously stored slice of the content item; and removing, by the buffer management controller, the at least one previously stored slice of the content item from the virtual buffer in response to determining that the status indicates that the at least one previously stored slice of the content item is not in use.

12. The system of claim 8, the operations further comprising:

selecting, by the buffer management controller, a first virtual buffer mapped to the two or more non-contiguous regions of the single storage buffer, wherein the first virtual buffer is the virtual buffer; and consolidating, by the buffer management controller, the two or more non-contiguous regions mapped to the first virtual buffer into the single contiguous region of the single storage buffer; and mapping, by the buffer management controller, the first virtual buffer to the single contiguous region of the single storage buffer.

13. The system of claim 12, wherein the consolidating further comprises:

identifying, by the buffer management controller, a target contiguous region and an eliminated region from the two or more non-contiguous regions;

determining, by the buffer management controller, the consolidation direction based on the shortest distance between the target contiguous region and the eliminated region;

identifying, by the buffer management controller, a moving region mapped to a second virtual buffer between the target contiguous region and the eliminated region along the consolidation direction;

shrinking, by the buffer management controller, the eliminated region by shifting at least one boundary of the eliminated region along the consolidation direction as one or more slices of the content item are removed from the eliminated region;

unmapping, by the buffer management controller, the eliminated region from the first virtual buffer;

shifting, by the buffer management controller, boundaries of the moving region along the consolidation direction to encompass address space in the single storage buffer previously used by the eliminated region; and extending, by the buffer management controller, at least one boundary of the target contiguous region along the consolidation direction to encompass address space in the single storage buffer previously used by the moving region.

14. The system of claim 13, wherein the shifting further comprises:

extending, by the buffer management controller, a first boundary of the moving region along the consolidation direction to encompass the address space in the single storage buffer previously used by the eliminated region; and shrinking, by the buffer management controller, a second boundary of the moving region along the consolidation direction by an amount corresponding to the extension of the first boundary.

15. A non-transitory computer-readable medium having instructions stored thereon that, when executed by at least one computing device, cause the at least one computing device to perform operations comprising:

receiving, by a buffer management controller, a request to initiate at least one sequentially-processing buffer-re-quiring component;

creating, by the buffer management controller, a virtual buffer having a maximum capacity for the at least one sequentially-processing buffer-requiring component, wherein the maximum capacity of the virtual buffer is determined based on at least one of: a number of existing virtual buffers, a total capacity of a single storage buffer, and a maximum amount of sequentially-processing buffer-requiring components that can be initiated at a given time;

identifying, by the buffer management controller, one or more available regions in the single storage buffer;

mapping, by the buffer management controller, the virtual buffer to the one or more available regions in response to determining that address space in the one or more available regions of the single storage buffer exceeds or is equal to the maximum capacity of the virtual buffer; and consolidating, by the buffer management controller, two or more non-contiguous regions mapped to the virtual buffer into a single contiguous region of the single storage buffer by at least shrinking a first non-contigu-ous region of the two or more non-contiguous regions by shifting at least one boundary of the first non-contiguous region along a consolidation direction, wherein the consolidation direction is determined based on a shortest distance between the first non-contiguous region and another non-contiguous region of the two or more non-contiguous regions.

16. The non-transitory computer-readable medium of claim 15, the operations further comprising:

receiving, by the buffer management controller, a memory allocation request from the at least one sequentially-processing buffer-requiring component;

receiving, by the buffer management controller, a subset of a plurality of slices of a content item from a data source; and storing, by the buffer management controller, the subset of the plurality of slices of the content item in one or more regions of the single storage buffer mapped to the virtual buffer associated with the at least one sequen-tially-processing buffer-requiring component.

17. The non-transitory computer-readable medium of claim 16, the operations further comprising:

prior to storing the subset of the plurality of slices of the content item, determining, by the buffer management controller, a status of at least one previously stored slice of the content item; and removing, by the buffer management controller, the at least one previously stored slice of the content item from the virtual buffer in response to determining that the status indicates that the at least one previously stored slice of the content item is not in use.

18. The non-transitory computer-readable medium of claim 15, the operations further comprising:

selecting, by the buffer management controller, a first virtual buffer mapped to the two or more non-contigu-ous regions of the single storage buffer, wherein the first virtual buffer is the virtual buffer;

consolidating, by the buffer management controller, the two or more non-contiguous regions mapped to the first virtual buffer into the single contiguous region of the single storage buffer; and mapping, by the buffer management controller, the first virtual buffer to the single contiguous region of the single storage buffer.

19. The non-transitory computer-readable medium of claim 18, wherein the consolidating further comprises:

identifying, by the buffer management controller, a target contiguous region and an eliminated region from the two or more non-contiguous regions;

determining, by the buffer management controller, the consolidation direction based on the shortest distance between the target contiguous region and the elimi-nated region;

identifying, by the buffer management controller, a mov-ing region mapped to a second virtual buffer between the target contiguous region and the eliminated region along the consolidation direction;

shrinking, by the buffer management controller, the elimi-nated region by shifting at least one boundary of the eliminated region along the consolidation direction as one or more slices of a content item are removed from the eliminated region;

unmapping, by the buffer management controller, the eliminated region from the first virtual buffer;

shifting, by the buffer management controller, boundaries of the moving region along the consolidation direction to encompass address space in the single storage buffer previously used by the eliminated region; and extending, by the buffer management controller, at least one boundary of the target contiguous region along the consolidation direction to encompass address space in the single storage buffer previously used by the moving region.

20. The non-transitory computer-readable medium of claim 19, wherein the shifting further comprises:

extending, by the buffer management controller, a first boundary of the moving region along the consolidation direction to encompass the address space in the single storage buffer previously used by the eliminated region; and shrinking, by the buffer management controller, a second boundary of the moving region along the consolidation direction by an amount corresponding to the extension of the first boundary.

* * * * *